United States Patent
Zhang et al.

(10) Patent No.: US 10,674,151 B2
(45) Date of Patent: Jun. 2, 2020

(54) ADAPTIVE IN-LOOP FILTERING FOR VIDEO CODING

(71) Applicant: INTEL CORPORATION, Santa Clara, CA (US)

(72) Inventors: Ximin Zhang, San Jose, CA (US);
Sang-Hee Lee, San Jose, CA (US);
Keith W. Rowe, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 25 days.

(21) Appl. No.: 16/048,952

(22) Filed: Jul. 30, 2018

(65) Prior Publication Data

US 2019/0052877 A1 Feb. 14, 2019

(51) Int. Cl.
*H04N 19/124* (2014.01)
*H04N 19/82* (2014.01)
*H04N 19/117* (2014.01)
*H04N 19/157* (2014.01)
*H04N 19/172* (2014.01)
*H04N 19/146* (2014.01)

(52) U.S. Cl.
CPC ......... *H04N 19/124* (2014.11); *H04N 19/117* (2014.11); *H04N 19/146* (2014.11); *H04N 19/157* (2014.11); *H04N 19/172* (2014.11); *H04N 19/82* (2014.11)

(58) Field of Classification Search
CPC .......................... H04N 19/117; H04N 19/172
See application file for complete search history.

(56) References Cited

U.S. PATENT DOCUMENTS

| | | | |
|---|---|---|---|
| 9,424,625 B2 * | 8/2016 | Alshina | H04N 19/48 |
| 9,774,851 B2 * | 9/2017 | Narroschke | H04N 19/176 |
| 10,009,622 B1 * | 6/2018 | Mukherjee | H04N 19/124 |
| 2010/0322303 A1 * | 12/2010 | Wada | H04N 19/176 |
| | | | 375/240.01 |
| 2014/0328387 A1 * | 11/2014 | Puri | H04N 19/176 |
| | | | 375/240.02 |
| 2014/0328414 A1 * | 11/2014 | Puri | H04N 19/176 |
| | | | 375/240.29 |
| 2019/0045186 A1 * | 2/2019 | Zhang | H04N 19/117 |
| 2019/0052877 A1 * | 2/2019 | Zhang | H04N 19/172 |
| 2019/0052911 A1 * | 2/2019 | Zhang | H04N 19/82 |
| 2019/0124349 A1 * | 4/2019 | Kuusela | H04N 19/70 |

OTHER PUBLICATIONS

The AV1 Constrained Directional Enhancement Filter; Valin; CISCO; 2017. (Year: 2017).*
The AV1 constrained enhancement filter; Valin; CISCO; 2018. (Year: 2018).*

(Continued)

*Primary Examiner* — Luis Perez-Fuentes
(74) *Attorney, Agent, or Firm* — Green, Howard & Mughal LLP.

(57) ABSTRACT

Techniques related to coding video using adaptive in-loop filtering enablement are discussed. Such techniques may include determining whether or not to perform in-loop filtering based on evaluating a maximum coding bit limit of a picture of the video, a quantization parameter of the picture, and a coding structure of the video.

22 Claims, 10 Drawing Sheets

(56) References Cited

OTHER PUBLICATIONS

Into the depths; technical details behind AV1; Egge; 2018. (Year: 2018).*
Separable adaptive loop filter; Auyeng; 2010. (Year: 2010).*
Enhanced switching interpolation filter for hevc; 2010. (Year: 2010).*
Separable wiener filter based adaptive in-loop filter for coding; Siekmann; 2010. (Year: 2010).*
The AV1 Constrained Directional Enhancement Filter; Midtskogen; CISCO; 2017. (Year: 2017).*
Integrating Thor tools into the emerging AV1 codec; CISCO; 2017. (Year: 2017).*
A switchable loop restoration with side-information framework AV1; Google; 2017. (Year: 2017).*
NPL Google Search; 2019 (Year: 2019).*

* cited by examiner

| | | | | | | |
|---|---|---|---|---|---|---|
| $PV_{-3,+3}$ | $PV_{-2,+3}$ | $PV_{-1,+3}$ | $PV_{0,+3}$ | $PV_{+1,+3}$ | $PV_{+2,+3}$ | $PV_{+3,+3}$ |
| $PV_{-3,+2}$ | $PV_{-2,+2}$ | $PV_{-1,+2}$ | $PV_{0,+2}$ | $PV_{+1,+2}$ | $PV_{+2,+2}$ | $PV_{+3,+2}$ |
| $PV_{-3,+1}$ | $PV_{-2,+1}$ | $PV_{-1,+1}$ | $PV_{0,+1}$ | $PV_{+1,+1}$ | $PV_{+2,+1}$ | $PV_{+3,+1}$ |
| $PV_{-3,0}$ | $PV_{-2,0}$ | $PV_{-1,0}$ | $PV_{0,0}$ | $PV_{+1,0}$ | $PV_{+2,0}$ | $PV_{+3,0}$ |
| $PV_{-3,-1}$ | $PV_{-2,-1}$ | $PV_{-1,-1}$ | $PV_{0,-1}$ | $PV_{+1,-1}$ | $PV_{+2,-1}$ | $PV_{+3,-1}$ |
| $PV_{-3,-2}$ | $PV_{-2,-2}$ | $PV_{-1,-2}$ | $PV_{0,-2}$ | $PV_{+1,-2}$ | $PV_{+2,-2}$ | $PV_{+3,-2}$ |
| $PV_{-3,-3}$ | $PV_{-2,-3}$ | $PV_{-1,-3}$ | $PV_{0,-3}$ | $PV_{+1,-3}$ | $PV_{+2,-3}$ | $PV_{+3,-3}$ |

FIG. 4

| | | | | | | |
|---|---|---|---|---|---|---|
| $LP_{-3,+3}$ | | | | | | $LP_{+3,+3}$ |
| | $LP_{-2,+2}$ | | | | $LP_{+2,+2}$ | |
| | | $LP_{-1,+1}$ | | $LP_{+1,+1}$ | | |
| $DR_{-3,0}$ | $DR_{-2,0}$ | $DR_{-1,0}$ | $PV_{0,0}$ | $DR_{+1,0}$ | $DR_{+2,0}$ | $DR_{+3,0}$ |
| | | $LP_{-1,-1}$ | | $LP_{+1,-1}$ | | |
| | $LP_{-2,-2}$ | | | | $LP_{+2,-2}$ | |
| $LP_{-3,-3}$ | | | | | | $LP_{+3,-3}$ |

FIG. 5

ADAPTIVE IN-LOOP FILTERING FOR VIDEO CODING

BACKGROUND

In compression/decompression (codec) systems, compression efficiency and video quality are important performance criteria. For example, visual quality is an important aspect of the user experience in many video applications and compression efficiency impacts the amount of memory storage needed to store video files and/or the amount of bandwidth needed to transmit and/or stream video content. A video encoder compresses video information so that more information can be sent over a given bandwidth or stored in a given memory space or the like. The compressed signal or data is then decoded by a decoder that decodes or decompresses the signal or data for display to a user. In most implementations, higher visual quality with greater compression is desirable.

In-loop filtering, including deblock filtering and other enhancement filtering, is an important feature in modern video coding standards. Such filtering improves both objective and subjective video quality and compression efficiency. In the standards, parameters are defined to regulate such filtering operations. However, in implementation, parameter selection techniques may be left undefined.

It may be advantageous to improve in-loop filter selection to provide improved compression efficiency and/or video quality. It is with respect to these and other considerations that the present improvements have been needed. Such improvements may become critical as the desire to compress and transmit video data becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures:

FIG. 4 illustrates example pixel values of pixel to be filtered and neighboring pixels;

FIG. 5 illustrates example filter taps of an example constrained directional enhancement filter (CDEF) combination;

DETAILED DESCRIPTION

Figure 1:
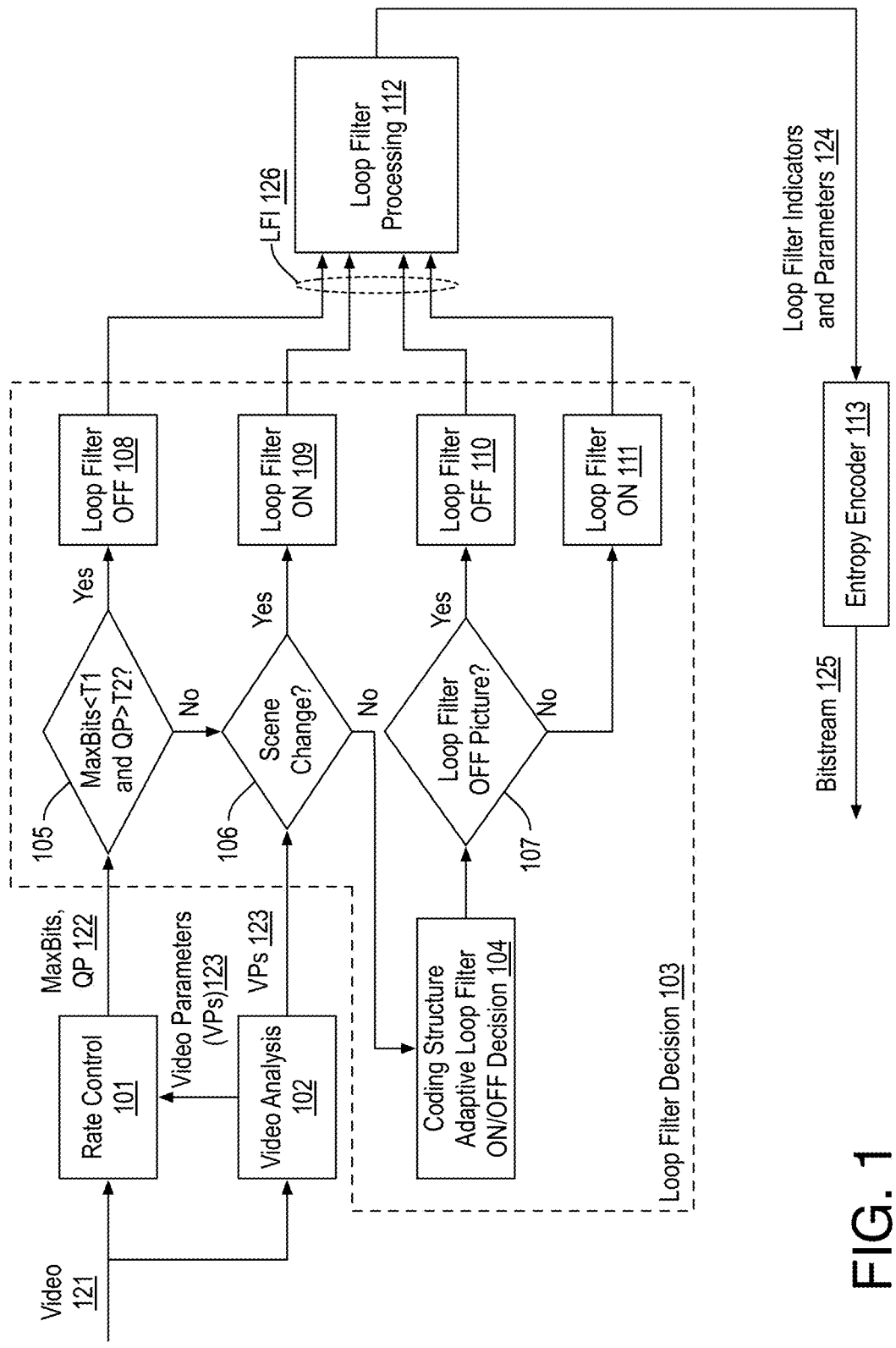
FIG. 1 is an illustrative diagram of an example system for providing video coding.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Furthermore, when a particular feature, structure, or characteristic is described in connection with an embodiment, it is submitted that it is within the knowledge of one skilled in the art to effect such feature, structure, or characteristic in connection with other implementations whether or not explicitly described herein. The terms "substantially," "close," "approximately," "near," and "about," generally refer to being within +/−10% of a target value. The terms "compares favorably" when used in reference to a threshold indicates the value in question is greater than or greater than or equal to the threshold. Similarly, the terms "compares unfavorably" when used in reference to a threshold indicates the value in question is less than or less than or equal to the threshold.

Methods, devices, apparatuses, computing platforms, and articles are described herein related to video coding and, in particular, to adaptive enablement of in-loop filters including constrained directional enhancement filters and loop refinement filters.

As described above, in modern video coding standards, in loop filtering is an important feature that can provide improved efficiency and/or video quality. As discussed herein, techniques include receiving an individual picture of a group of pictures video for coding, a maximum coding bit limit for the individual picture, and a picture level quantization parameter (QP) for the individual picture. The group of pictures has a coding structure defining how each picture thereof is to be coded as discussed further herein. In response to the maximum coding bit limit, the QP, and the picture type of the individual picture according to the coding structure, as well as other factors, an in-loop filter indicator is set to on (enabled) or off (disabled) for the individual picture. When the in-loop filter indicator is set to on, a particular type or types of in-loop filtering may be performed for coding units of the individual picture. For example, some coding units may still be set to off on a coding unit level as discussed further herein. When the in-loop filter indicator is set to off, such a type or types of in-loop filtering are skipped for all coding units of the individual picture. Herein, the in-loop filtering that is enabled or disabled is any in-loop filtering exclusive of deblock filtering and sample adaptive offset (SAO) filtering such as filtering using constrained directional enhancement filters (CDEF) and/or filtering using loop restoration filters (LRF), which are described further herein. Such CDEF and/or LRF filtering may be described as enhancement filtering, selective filtering, optional filtering, CDEF filtering, LRF filtering, CDEF and LRF filtering, or the like to differentiate them from deblock and/or SAO filtering. For example, deblock filtering and/or SAO filtering, which are also in-loop may be performed regardless of the result of setting the picture level and coding unlit level in-loop filter indicators.

In an embodiment, when the maximum coding bit limit compares unfavorably to a first threshold and the quantization parameter compares favorably to a second threshold, the in-loop filter indicator for the individual picture is set to off and such in-loop filtering (CDEF and/or LRF) is skipped for the individual picture. Coding of the individual picture is then performed based at least in part on the in-loop filter indicator to generate a bitstream such that when the in-loop filter indicator is on, selective in-loop filtering is performed (e.g., one or both of CDEF and/or LRF), with the caveat that some coding units may be skipped. The bitstream may be standards compliant to any standard. For example, the bitstream may be an Alliance for Open Media compliant bitstream.

When the maximum coding bit limit compares favorably to the first threshold or the quantization parameter compares unfavorably to a second threshold, the coding structure of the group of pictures and/or other factors are evaluated to determine whether to set the in-loop filter indicator for the individual picture to on or off. In an embodiment, when the individual picture is a scene change picture, the in-loop filter indicator for the individual picture is set to on. In an embodiment, when the individual picture is an I-picture within the coding structure, the in-loop filter indicator for the individual picture is set to on. In an embodiment, when the coding structure is a hierarchical B structure, as described further herein, the in-loop filter indicator is set to off for non-reference B-pictures and on for all other pictures (i.e., I-pictures and reference B-picture). In another embodiment, when the coding structure is a hierarchical B structure, the in-loop filter indicator is set to off for non-reference B-pictures and reference B-pictures that can only be referenced by non-reference B-pictures and to on for all other pictures (i.e., I-pictures and reference B-pictures that can be referenced by other reference B-pictures). In an embodiment, when the coding structure is a low delay coding structure having a constant maximum coding bit limit for pictures other than a first temporal picture of the group of pictures, the in-loop filter indicator is set to off at a fixed picture interval (i.e., every other picture, every third picture, or every fourth picture). In an embodiment, when the coding structure is an adaptive quantization parameter low delay coding structure, as described further herein, the in-loop filter indicator is set to off when a high quantization parameter is associated with the individual picture and on when a low quantization parameter is associated with the individual picture. Other embodiments, including further evaluation of pictures and coding units when the in-loop filter indicator is set to on at the picture level are discussed further herein.

As discussed, CDEF and/or LRF may be enabled or disabled at the picture and/or coding unit level. As used herein, the term coding unit indicates any segment of a picture such as a block, super block, loop restoration unit, etc. In particular, within the scope of the Alliance for Open Media (AOM), AOMedia Video 1 (AV1) is a next-generation video codec. In addition to deblock filtering, AV1 includes two other in-loop filters: CDEF and LRF. These additional in-loop filters remove coding artifacts and improve objective quality. The CDEF includes a directional deringing filter in a first stage, which detects the direction of a coding unit such as a super block and then adaptively filters along the identified direction, and a constrained low-pass filter in a second stage. The LRF includes a wiener filter and a self-guided filter that are mutually exclusive such that only one is used for each a coding unit (e.g., a loop restoration unit) at a time. In AV1, the in-loop filters are cascaded such that deblocking filtering is performed first, CDEF is second, and LRF is third. In some encode contexts, such processing can be a bottleneck of the hardware encode pipeline. Although the additional bits used by CDEF and LRF is a small percentage of the overall bitstream, such processing can be difficult particularly in very low bitrate coding.

The techniques discussed herein provide a picture (or frame) level adaptive in-loop filter (i.e., CDEF, LRF, or both CDEF and LRF) on/off technique to adaptively enable and disable the in-loop filter for the whole picture based on the picture type, group of picture (GOP) structure, the interval between the in-loop filter on pictures, and other factors. Furthermore, a rate and QP adaptive in-loop filter on/off decision technique is developed to avoid underflow and unneeded in-loop filter processing. The techniques discussed herein achieve similar objective and subjective quality as compared to full filter implementation with less than half of the complexity. Thereby, implementation of the discussed techniques provides for improved device performance in terms of speed, processing efficiency, and power consumption.

FIG. 1 is an illustrative diagram of an example system 100 for providing video coding, arranged in accordance with at least some implementations of the present disclosure. As shown in FIG. 1, system 100 includes a rate control module 101, a video analysis module 102, a loop filter decision module 103, a loop filter processing module 112, and an entropy encoder 113. Loop filter decision module 103 includes a coding structure adaptive loop filter decision module 104, a comparator module 105 (e.g., labeled MaxBits<T1 and QP>T2?), a scene change determination module 106 (e.g., labeled Scene Change?), a loop filter picture level evaluation module 107 (e.g., labeled Loop Filter OFF Picture?), and loop filter setting modules 108-111 (e.g., labeled Loop Filter ON or Loop Filter OFF).

Rate control module 101 and video analysis module 102 receive video 121. System 100 provides video compression and system 100 may be a video encoder implemented via a computer or computing device or the like. For example, system 100 receives video 121 and generates a bitstream 125 that is compatible with a video compression-decompression (codec) standard such as AOM AV1, or the like. System 100 may be implemented via any suitable device such as, for example, a personal computer, a laptop computer, a tablet, a phablet, a smart phone, a digital camera, a gaming console, a wearable device, a display device, an all-in-one device, a two-in-one device, or the like or platform such as a mobile platform or the like. For example, as used herein, a system, device, computer, or computing device may include any such device or platform.

System 100 may include other modules not shown for the sake of clarity of presentation. For example, system 100 may include a transform module, an intra prediction module, a motion estimation module, a motion compensation module, a reference picture buffer, a scanning module, etc., some of which are discussed herein with respect to FIG. 12. In some embodiments, system 100 includes a local decode loop for generating reference pictures or frames used in the encoding process. Such modules are known to those of skill in the art and are not discussed further herein for the sake of clarity in presenting the described techniques.

As discussed, rate control module 101 and video analysis module 102 receive video 121. Video 121 may include any suitable video frames, video pictures, sequence of video frames, group of pictures, groups of pictures, video data, or the like in any suitable resolution. For example, video 121 may be video graphics array (VGA), high definition (HD), Full-HD (e.g., 1080p), or 4K resolution video, or the like. For example, the video may be video graphics array (VGA), high definition (HD), Full-HD (e.g., 1080p), 4K resolution video, 5K resolution video, or the like, and the video may include any number of video frames, sequences of video frames, pictures, groups of pictures, or the like. Techniques discussed herein are discussed with respect to pictures, slices, coding units, super blocks, and loop restoration units for the sake of clarity of presentation. However, such pictures may be characterized as frames, video pictures, sequences of pictures, video sequences, etc., such super blocks and/or loop restoration units may be characterized as largest coding units, coding units, coding blocks, macroblocks, sub-units, sub-blocks, etc. For example, a picture or frame of color video data may include a luminance plane or component and two chrominance planes or components at the same or different resolutions with respect to the luminance plane. Input video 121 may include pictures or frames that may be divided into blocks of any size, which contain data corresponding to blocks of pixels. Such blocks may include data from one or more planes or color channels of pixel data.

As shown in FIG. 1, video analysis module 102 determines, for individual pictures of video 121 and/or for groups of pictures of video 121, video parameters 123. Video analysis module 102 may determine video parameters 123 using any suitable technique or techniques. Furthermore, video parameters 123 may include any suitable video analysis parameters or data such as picture variance, spatial complexity, temporal correlation, etc. In an embodiment, video analysis module 102 performs downsampling and/or analysis pictures of video 121 to generate video parameters 123. As shown, video parameters 123 may be used by rate control module 101 and scene change determination module 106 as discussed further herein.

Rate control module 101 receives video 121 and video parameters 123. Rate control module 101 determines, for individual pictures of video 121, a maximum coding bit limit and a quantization parameter. Rate control module 101 provides a signal 122 including the maximum coding bit limit (e.g., MaxBits) and the quantization parameter (e.g., QP) to comparator module 105. As used herein, the term maximum coding bit limit is a maximum amount of allowed bits for coding a picture. The maximum coding bit limit may be characterized as maximum bits, maximum coding bits, a maximum coding bit limit, or the like for the current picture. In particular, each picture has a corresponding maximum coding bit limit as set by rate control module 101. The maximum coding bit limit for the current picture is determined using any suitable technique or techniques. In an embodiment, the maximum coding bit limit is based on current buffer conditions and/or an average target rate for coding each picture of video 121. In some examples, the maximum coding bit limit, for a current picture of video 121, is a sum of a hypothetical reference decoder buffer fullness (e.g., a current buffer condition) associated with an immediately prior encode picture and an average target rate for each picture of the group of pictures.

Furthermore, the quantization parameter may be a quantization parameter for compressing ranges of values to particular values for a picture. The quantization parameter may be determined using any suitable technique or techniques such as rate control techniques known in the art.

Loop filter decision module 103 (e.g., via comparator module 105) receives the maximum coding bit limit and the quantization parameter for the current picture (e.g., for each picture) via signal 122. Comparator module 105 determines a picture level in-loop filter decision for one or both of CDEF and LRF using the maximum coding bit limit and the quantization parameter for the current picture. In FIG. 1, each in-loop filter instance is labeled as loop for the sake of clarity and such terms are used interchangeably herein. In an embodiment, comparator module 105 compares the maximum coding bit limit to a first threshold and the quantization parameter to a second threshold. If the maximum coding bit limit compares unfavorably to the first threshold (e.g., is less than, equal to, or not greater than) and the quantization parameter compares favorably to the second threshold (e.g., is greater than, equal to, or not less than), comparator module 105 may provide a signal to loop filter setting module 108 to set an in-loop filter indicator for the current picture to off based on the received signal. As used herein, an indicator may be any data structure that indicates a particular setting such as a flag, one or more bits, etc.

As used herein, an in-loop filter indicator or loop filter indicator indicates one or more in-loop or loop filters are to be applied at the level associated with the indicator (i.e., picture level, slice level, coding unit level, etc.). The in-loop filter indicator or loop filter indicator may indicate one or both of CDEF and LRF are to be used or not at the particular level. In an embodiment, the in-loop filter indicator or loop filter indicator indicates both CDEF and LRF are to be used or not at the particular level. In an embodiment, a CDEF filter indicator is provided to indicate CDEF is to be used or not at the particular level. In an embodiment, an LRF filter indicator is provided to indicate CDEF is to be used or not at the particular level. Furthermore, as used herein, when an indicator at a particular level indicates CDEF, LRF, or both are not to be used (e.g., indicator is off), then such processing is skipped for the entirety of the sub-levels corresponding thereto. For example, if a picture level indicator is off then processing is skipped for every slice and coding unit of the picture. If a slice level indicator is off then processing is skipped for every coding unit of the slice. However, when an indicator at a particular level indicates CDEF, LRF, or both are to be used (e.g., indicator is on), such processing may still be skipped at lower levels if the lower level indicator is off. For example, if a picture level indicator is on then processing may still be skipped (e.g., off) for a particular slice or coding unit of the picture.

With continued reference to FIG. 1, loop filter setting module 108 provides the in-loop filter indicator for the current picture to loop filter processing module 112 via loop filter indicators signal 126, which includes loop filter indicators (LFI). For example, the loop filter indicators indicate whether a picture of video 121 is to implement or skip CDEF, LRF, both CDEF and LRF. For example, the loop filter indicators may be provided in a slice header of bitstream 125. In an embodiment, setting loop filter processing on or off based on the comparison of the maximum coding bit limit to the first threshold and the quantization parameter to the second threshold may prevent buffer underflow for one-pass coding implementations.

As discussed, the maximum coding bit limit for a current picture is compared to a first threshold via comparator module 105. The first threshold may be any suitable value and may be characterized as a maximum coding bit limit threshold. In an embodiment, the first threshold is an adaptive threshold based on picture resolution of the current picture such that the higher the resolution of the current picture, the higher the value of the first threshold. The first threshold may be adapted based on the resolution of the current picture using any suitable technique or techniques. In some examples, the first threshold is a product of a constant value and a total number of largest coding units in the current picture.

Also as discussed, the quantization parameter for a current picture is compared to a second threshold via comparator module 105. The second threshold may be any suitable value and may be characterized as a quantization parameter threshold or the like. In some examples, the second threshold may be a constant value. For example, the second threshold may be a value of about 46 to 51. For example, in some coding contexts, the available quantization parameter may range from 1 to 51 such that the second threshold is a relatively high quantization parameter threshold. In other coding contexts, the available quantization parameter may range from 0 to 255 and the second threshold is in the range of 235-245 with 240 being particularly advantageous. In an embodiment, the second threshold is a particular percentage of a maximum available quantization parameter (e.g., a maximum available quantization parameter allowed by a coding standard, coding profile, etc.). In an embodiment, the second threshold is not less than 90% of the maximum available quantization parameter. In an embodiment, the second threshold is not less than 94% of the maximum available quantization parameter.

As discussed, if the maximum coding bit limit compares unfavorably to the first threshold and the quantization parameter compares favorably to the second threshold, comparator module 105 provides a signal to loop filter setting module 108 to set an in-loop filter indicator for the current picture to off based on the received signal. Also as discussed, the in-loop filter indicator indicates usage of CDEF, LRF, or both but does not influence usage of other filtering such as deblock filtering.

If the maximum coding bit limit compares favorably to the first threshold (e.g., is greater than or not less than) or the quantization parameter compares unfavorably to the second threshold (e.g., is less than or not greater than), comparator module 105 provides a signal to scene change determination module 106. Based on the received signal, scene change determination module 106 determines whether the current picture is a scene change picture (e.g., whether the current picture is associated with a scene change in the content represented by video 121). Scene change determination module 106 may determine whether the current picture is a scene change picture using any suitable technique or techniques. In some examples, scene change determination module 106 determines whether the current picture is a scene change picture based on a comparison of the temporal complexity of the current picture (e.g., as determined via video analysis module 102) to the average temporal complexity of any number of previous pictures. For example, if the temporal complexity of the current picture is greater than the average temporal complexity by a threshold amount (e.g., the difference between the temporal complexity of the current picture and the average temporal complexity is greater than a threshold) or by a particular factor (e.g., the ratio of the temporal complexity of the current picture to the average temporal complexity is greater than a threshold) or the like, the current picture is deemed to be a scene change picture.

If the current picture is determined to be a scene change picture, scene change determination module 106 provides a signal to loop filter setting module 109 to set the in-loop filter indicator for the current picture to on based on the picture being a scene change picture. Furthermore, loop filter setting module 109 provides the in-loop filter indicator for the current picture to loop filter processing module 112 via loop filter indicators signal 126, which may include skip indicators (SI) as discussed with respect to loop filter setting module 108.

If the current picture is determined to not be a scene change picture, scene change determination module 106 provides a signal to coding structure adaptive loop filter decision module 104. Based on the received signal, coding structure adaptive loop filter decision module 104 determine whether to apply or skip in-loop filtering (i.e., CDEF, LRF, or both) at the picture level or to perform such filtering at the picture level for the current picture based on a coding structure of the group of pictures in which the current picture is included, as is discussed further below.

Based on the determination as to whether in-loop filtering is to be performed for the current picture, coding structure adaptive loop filter decision module 104 provides a signal to loop filter picture level evaluation module 107. If the signal indicates in-loop filtering is not to be performed (e.g., in-loop filtering is off) such that the current picture is an in-loop filtering skip picture, loop filter picture level evaluation module 107 provides a signal to loop filter setting module 110 to set an in-loop filter indicator for the current picture to off. Furthermore, loop filter setting module 110 provides the in-loop filter indicator for the current picture to loop filter processing module 112 via loop filter indicators signal 126. If the signal indicates the current picture is an in-loop filtering non-skip picture, loop filter picture level evaluation module 107 provides an on signal to loop filter setting module 111 and loop filter processing module 112 performs in-loop filtering (e.g., CDEF, LRF, or both).

Figures 2, 3:
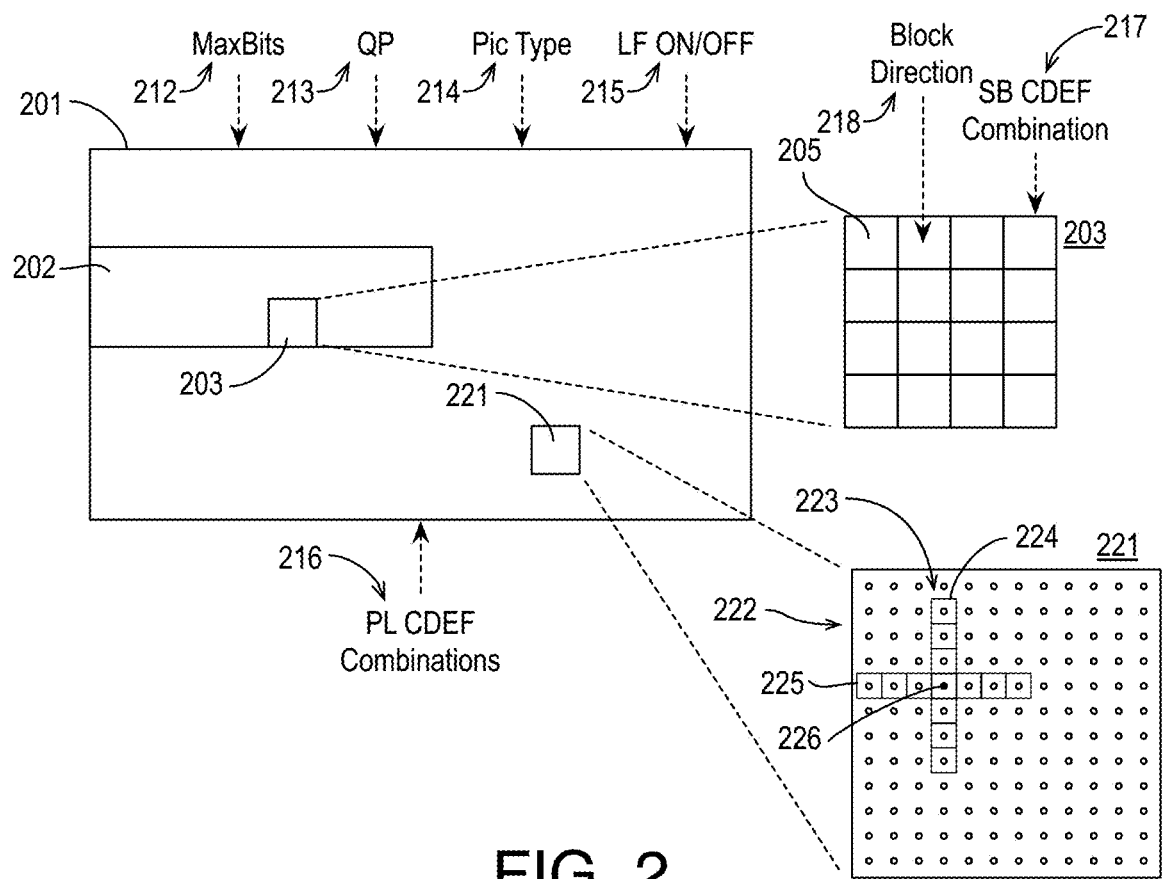
FIG. 2 illustrates an example video picture.
FIG. 3 illustrates example constrained directional enhancement filter (CDEF) directions.
Figure 6:
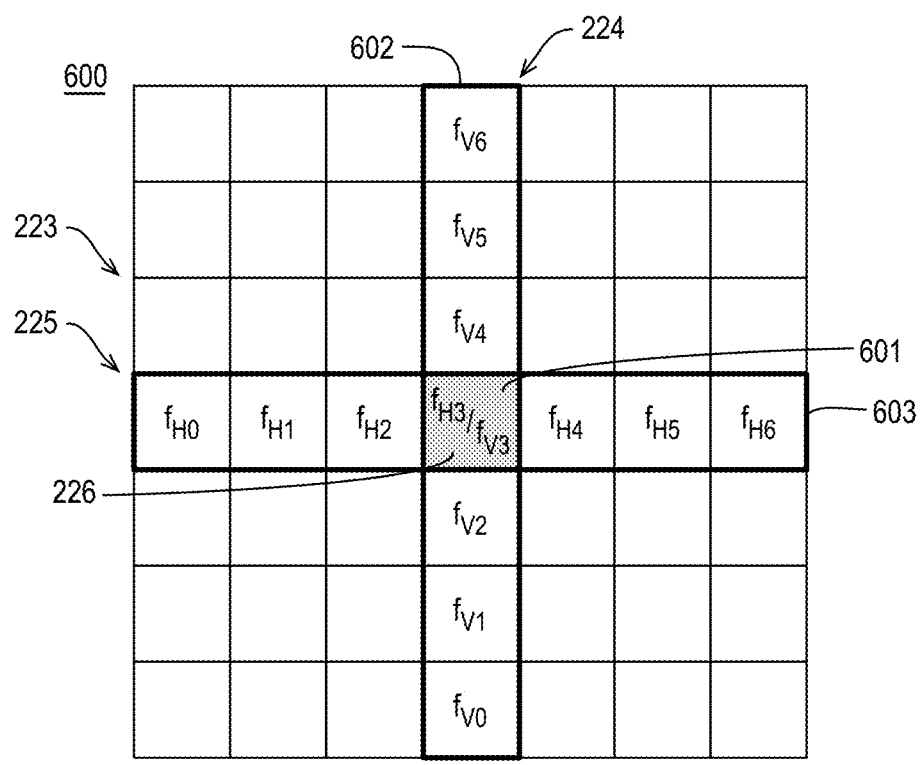
FIG. 6 illustrates example filter taps of an exemplary loop restoration filter (LRF)

As discussed, loop filter decision module 103 determines whether or not CDEF, LRF, or both are to be performed at a picture level and indicates such decisions via loop filter indicators signal 126. Such indicators are also provided (after entropy encoding) in bitstream 125 for use by a decoder. As discussed further herein, such determinations as to whether or not to apply CDEF, LRF, or both may be made on the coding structure of video 121 and may be further implemented at the coding unit (super block or loop restoration unit) level. Discussion first turns to exemplary in-loop filter processing to which such loop filter decisions are applied. FIGS. 2, 3, 4, and 5 illustrate example CDEF and FIGS. 2, 4, and 6 illustrate example LRF.

FIG. 2 illustrates an example video picture 201, arranged in accordance with at least some implementations of the present disclosure. Video picture 201 may include any picture of a video sequence or clip such as a VGA, HD, Full-HD, 4K, 5K, etc. video frame. As shown, video picture 201 may be segmented into one or more slices as illustrated with respect to slice 202 of video picture 201. Furthermore, video picture 201 may be segmented into one or more super blocks as illustrated with respect to super block 203, which may, in turn, be segmented into one or more blocks 205. In the illustrated embodiment, video picture 201 is segmented into super blocks, which are segmented into blocks. However, any frame or picture structure may be used that divide the frame into macroblocks, blocks, units, sub-units, etc. As used, herein, the term coding unit or simply unit may refer to any partition or sub-partition of a video picture that is at the sub-picture and sub-slice level. For example, a coding unit may refer to a largest coding unit, a prediction unit, a transform unit, a macroblock, a coding block, a prediction block, a transform block, etc.

Furthermore, as shown in FIG. 2, video picture 201 has a maximum coding bit limit (MaxBits) 212, a quantization parameter (QP) 213, a picture type 214, and a loop filter indicator (LF ON/OFF) 215 corresponding thereto. QP 213 is any suitable value or parameter that determines a step size for associating transformed coefficients with a finite set of steps during quantization. For example, residuals of video picture 201 may be transformed from the spatial domain to the frequency domain using an integer transform that approximates a transform such as the discrete cosine transform (DCT). QP 213 determines the step size for associating the transformed coefficients with a finite set of step such that lower QP values retain more information while higher QP values lose more information in the inherently lossy process of quantization. Picture type 214 may be any picture type such as intra (I), predicted (P), bidirectional (B), non-reference B-picture (B2), reference B-picture (B1 or B), etc. Also as shown, video picture 201 has picture level (PL) CDEF combinations 216 corresponding thereto. PL CDEF combinations 216 indicate CDEF combinations that may be used for particular super blocks such as super block 203 from available CDEF combinations. That is, PL CDEF combinations 216 are selected from available CDEF combinations and only PL CDEF combinations 216 may be used for video picture 201. Furthermore, super block 203 has a super block (SB) CDEF combination 217 corresponding thereto. SB CDEF combination 217 may be determined using any suitable technique or techniques. Notably, any block 205 of super block 203 may only use SB CDEF combination 217 to perform CDEF filtering thereof. In particular, during CDEF filtering, for each block 205, a block direction 218 is determined and SB CDEF combination 217 is then applied according to block direction 218 and such processing is repeated for each block 205 of super block 203. For a next super block, the process is repeated for each block thereof with only the SB CDEF combination for the next SB being used.

FIG. 3 illustrates example constrained directional enhancement filter (CDEF) directions 300, arranged in accordance with at least some implementations of the present disclosure. For example, for each block 205 (please refer to FIG. 2), one of CDEF directions 300 is detected using any suitable technique or techniques such as direction searching based on reconstructed pixels, using pattern matching techniques, etc. As shown, each block may have a corresponding direction, d, indexed as 0 (e.g., at about 45° with respect to horizontal), 1 (e.g., at about 22.5° with respect to horizontal), 2 (e.g., about horizontal), 3 (e.g., at about 157.5° with respect to horizontal), 4 (e.g., at about 135° with respect to horizontal), 5 (e.g., at about 112.5° with respect to horizontal), 6 (e.g., about vertical), or 7 (e.g., at about 67.5° with respect to horizontal). Although illustrated with respect to 8 available directions, any suitable number of directions may be used. In the context of FIG. 3, when a direction, d, of a block is detected, the constrained linear deringing filter is applied along the direction (as indicated by matching numbers) and the low-pass filter is applied offset with respect to direction, d, by 45° as is discussed herein below with respect to FIGS. 4 and 5.

FIG. 4 illustrates example pixel values 400 of pixel to be filtered 401 and neighboring pixels 402, arranged in accordance with at least some implementations of the present disclosure. As shown in FIG. 4, pixel to be filtered 401 (e.g., a target pixel) has a pixel value, $PV_{0,0}$ and is surrounded by neighboring pixels 402 having pixel values labeled based on their position with respect to pixel to be filtered 401 with +1 being one pixel position to the right or up, −3 being three pixel positions left or down, and so on such that, for example, neighboring pixel 402b has a pixel value of $PV_{+2,-2}$.

FIG. 5 illustrates example filter taps 500 of an example constrained directional enhancement filter (CDEF) combination 501, arranged in accordance with at least some implementations of the present disclosure. As shown in FIG. 5, deringing filter taps 502 (labeled DR) are applied along a detected direction 504 while low-pass filter taps 503 (labeled LP) are applied misaligned with respect to detected direction 403 such as at about 45° and 135° with respect to detected direction 403. For example, low-pass filter taps 503 are applied in a cross shape with one line of the cross being about 45° with respect to a detected direction of a block. In FIG. 5, blank pixel locations (e.g., without a filter tap) are not used in filtering pixel to be filtered 401.

When CDEF combination 501 is applied to pixel values 400, the new or filtered value for pixel to be filtered 401 is determined by multiplying a weight corresponding to each of deringing filter taps 502 and low-pass filter taps 503 and the corresponding pixel value and averaging the weighted sum (e.g., by weighted averaging) or similar techniques. It is noted that a filter tap is also located at pixel to be filtered 401 (and a corresponding weight is used). However, a filter tap location may be discarded when the pixel value at the filter tap location and the pixel value of pixel to be filtered 401 differ greater than a threshold amount. For example, such large discrepancy pixel values may be indicative of picture detail and not ringing or noise that is desired to be smoothed by a deringing filter or low-pass filter. For example, if a difference between a pixel value, $PV_{+2,-2}$, of neighboring pixel 402b and the pixel value, $PV_{0,0}$, of pixel to be filtered 401 is greater than a threshold, the pixel value, $PV_{+2,-2}$, of neighboring pixel 402b may be discarded in determining the new pixel value for pixel to be filtered 401. Similar thresholding may be applied to pixel value for deringing filter taps 502 and low-pass filter taps 503. Furthermore, deringing filter taps 502 and low-pass filter taps 503 may apply different threshold values. In an embodiment, the threshold values are determined based on deringing filter strength 421 and low-pass filter strength 422 of a CDEF combination as is known in the art.

Returning to FIG. 2, video picture 201 is also segmented into loop restoration units (LRUs) as illustrated with respect to LRU 221. For example, video picture 201 is fully segmented into LRUs, which are not shown for the sake of clarity of presentation. As shown with respect to LRU 221, each LRU includes an array of pixels 222 (e.g., having pixel values) extending in both the horizontal dimension and the vertical dimension. Furthermore, each LRU 221 has corresponding horizontal filter coefficients and vertical filter coefficients for application by a loop restoration filter 223. That is, loop restoration filter 223 is applied to each of pixels 222 using horizontal and vertical filter coefficients for each filter tap thereof. As shown, loop restoration filter 223 has a vertical filter 224 and a horizontal filter 225. Loop restoration filter 223 may be any 2D separable filter (e.g., separable into vertical filter 224 and a horizontal filter 225). In an embodiment, loop restoration filter 223 is a wiener filter. In an embodiment, loop restoration filter 223 is a 2D symmetric separable wiener filter having 7 vertical filter taps and 7 horizontal filter taps.

As shown with respect to target pixel 226, each of pixels 222 is filtered using horizontal filter coefficients and vertical filter coefficients as implemented by horizontal filter 225 and vertical filter 224, respectively of loop restoration filter 223 using some neighboring pixels of pixels 210. As used herein, the term filter coefficient indicates a filter coefficient or strength applied to a particular filter tap. For example, a filter coefficient of zero would effectuate not using the pixel value under the tap for determining a filtered pixel value of a target pixel 226 and a filter coefficient of one would effectuate full use of the pixel value under the tap for determining the filtered pixel value of target pixel 226 (assuming the filter coefficients sum to one). As shown, to determine a filtered pixel value of target pixel 226, vertical filter 224 uses only pixel values aligned with the vertical (V) dimension and horizontal filter 225 uses only pixel values aligned with the horizontal (H) dimension.

FIG. 6 illustrates example filter taps 600 of an exemplary loop restoration filter (LRF) 223, arranged in accordance with at least some implementations of the present disclosure. As shown, horizontal filter taps 603 having corresponding horizontal filter coefficients (labeled $f_{H0-6}$) are applied along the horizontal dimension and vertical filter taps 602 having corresponding vertical filter coefficients (labeled $f_{V0-6}$) are applied along the vertical dimension. When loop restoration filter 223 is applied to target pixel 226, the new or filtered value for target pixel 226 is determined by applying loop restoration filter 223 (e.g., a wiener filter) according to the filter coefficients defined by the horizontal and vertical filter coefficients selected for loop restoration filter 223. Such coefficients provide pixel value weighting during the filtering. It is noted that a filter tap 601 is also located at target pixel 226 (and a corresponding weight is used). Typically, the corresponding coefficient value may be derived by having the sum of all of vertical and horizontal filter coefficients sum to one. In some embodiments, horizontal filter 225 and vertical filter 224 are applied separately. In such embodiments, the horizontal filter coefficient value for filter tap 601 provides for a summing of one for the horizontal filter coefficients and, likewise, the vertical filter coefficient value for filter tap 601 provides for a summing of one for the vertical filter coefficients. In some embodiments, horizontal filter 225 and vertical filter 224 are symmetric filters such that $f_{H0}=f_{H6}$, $f_{H1}=f_{H5}$, $f_{H2}=f_{H4}$, $f_{V0}=f_{V6}$, $f_{V1}=f_{V5}$, and $f_{V2}=f_{V4}$. In such embodiments, for each of horizontal filter 225 and vertical filter 224, only three coefficients need to be indicated in bitstream. For example, for horizontal filter 225, if fin, flu, and fin are indicated, $f_{H6}$, $f_{H5}$, and $f_{H4}$ as well as tin may be derived therefrom (e.g., $f_{H0}=f_{H6}$, $f_{H1}=f_{H5}$, $f_{H2}=f_{H4}$ and $f_{H3}=-2*(f_{H0}+f_{H1}+f_{H2})$).

Returning now to FIG. 1, as discussed, coding structure adaptive loop filter decision module 104 determines whether in-loop filtering is to be performed for a current picture such that the current picture is an in-loop filtering skip picture or an in-loop filtering non-skip picture. Coding structure adaptive loop filter decision module 104 may determine whether a current picture is an in-loop filtering skip picture or an in-loop filtering non-skip picture based on the coding structure of video 121 using any techniques discussed herein. In an embodiment, coding structure adaptive loop filter decision module 104 determines whether the current picture is an Intra-picture and, if so, coding structure adaptive loop filter decision module 104 sets the current picture as an in-loop filtering non-skip picture.

In some embodiments, system 100 implements video coding with a hierarchical B-structure in use. In such embodiments, coding structure adaptive loop filter decision module 104 determines the picture type of the current picture and, if the current picture is a non-reference B-picture (e.g., a B-picture not being used to code any other pictures of a group of pictures), coding structure adaptive loop filter decision module 104 sets the current picture as an in-loop filtering skip picture (e.g., the in-loop filter indicator is set to off). For example, such non-reference B-pictures may be characterized as B2-pictures. Furthermore, in such embodiments, all other hierarchical B-structure picture types (e.g., I-pictures, B0-pictures, B-pictures, and B1 pictures) are set as in-loop filtering non-skip pictures (e.g., the in-loop filter indicator is set to off). That is, when the coding structure is a hierarchical B structure and a current or individual picture is a non-reference B-picture, the in-loop filter indicator is set to off in response to the individual picture being a non-reference B-picture. As used herein, the term reference picture (of any type) indicates a picture that is used for motion estimation and compensation of a different picture. Furthermore, the term non-reference picture (of any type) indicates a picture that cannot be used for motion estimation and compensation of a different picture.

In other embodiments with hierarchical B-structure in use, coding structure adaptive loop filter decision module 104 may determine the picture type of the current picture and, if the current picture is a low level B-picture (e.g., a non-reference B-picture or a reference B-picture that can only be referenced by non-reference B-pictures; that is, a B1-picture or a B2-picture), coding structure adaptive loop filter decision module 104 sets the current picture as an in-loop filtering skip picture (e.g., the in-loop filter indicator is set to off). Furthermore, in such embodiments, all other hierarchical B-structure picture types (e.g., I-pictures, B0-pictures, and B-pictures) are set as in-loop filtering non-skip pictures (e.g., the in-loop filter indicator is set to off). This is, when the coding structure is a hierarchical B structure and a current or individual picture is one of a non-reference B-picture or a reference B-picture that can only be referenced by non-reference B-pictures, the in-loop filter indicator is set to off in response to the individual picture being a non-reference B-picture or a reference B-picture that can only be referenced by non-reference B-pictures.

Figure 7:
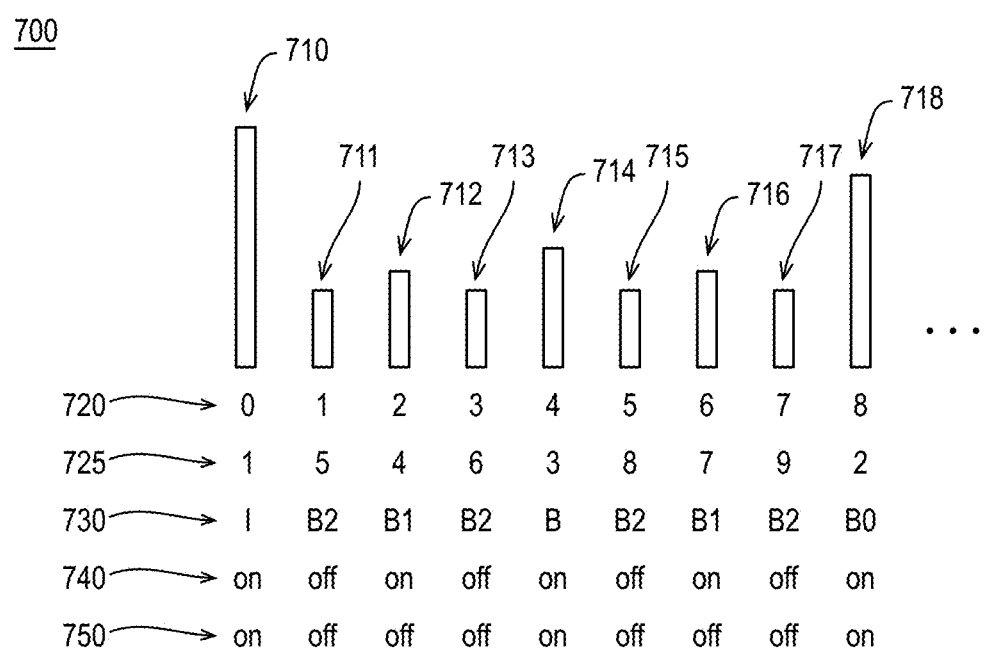
FIG. 7 illustrates an example group of pictures having a hierarchical B structure.

FIG. 7 illustrates an example group of pictures 700 having a hierarchical B structure, arranged in accordance with at least some implementations of the present disclosure. As shown in FIG. 7, group of pictures 700 includes pictures 710-718. In the illustrated example, group of pictures 700 is a group of 8 pictures (e.g., GOP=8; not counting I-picture 710) in a display order 720 indicating that display order 720 (e.g., 0-8) follows in the order of picture 710, picture 711, picture 712, picture 713, picture 714, picture 715, picture 716, picture 717, and picture 718. Pictures 700 are encoded in an encode order 725 in the order of picture 710, picture 718, picture 714, picture 712, picture 711, picture 713, picture 716, picture 715, and picture 717.

Each picture group of pictures 700 has picture types 730 such that picture 710 is an I-picture, picture 711 is a B2-picture, picture 712 is a B1-picture, picture 713 is a B2-picture, picture 714 is a B-picture, picture 715 is a B2-picture, picture 716 is a B1-picture, picture 717 is a B2-picture, and picture 718 is a B0-picture. For example, group of pictures 700 in a group of pictures in an encoding context where hierarchical B-pictures are provided. In an embodiment, group of pictures 700 is a group of pictures in an AV1 coding context. Although illustrated with particular details for the sake of clarity of presentation, group of pictures 700 may include any number of pictures of any suitable picture types in a suitable order.

As discussed, group of pictures 700 has a display order 720 such that upon decode, pictures 710-718 may be decoded and displayed in display order 720. Furthermore, group of pictures 700 has an encode order 725 that does not match display order 720. In an embodiment, group of pictures 700 are I-, B0-, B-, B1-, B2-pictures and group of pictures 700 are encoded in encode order 725 based on the hierarchy. For example, group of pictures 700 may have an encode order of: picture 710, picture 718.

As discussed with respect to FIG. 1, in some embodiments, coding structure adaptive loop filter decision module 104 may determine the picture type of the current picture and, when the current picture is a non-reference B-picture (e.g., a B-picture not being used to code any other pictures of a group of pictures), coding structure adaptive loop filter decision module 104 sets the in-loop filter indicator current picture to off. Furthermore, in such embodiments, all other hierarchical B-structure picture types (e.g., I-pictures, B0-pictures, B-pictures, and B1 pictures) are set as in-loop non-skip pictures (e.g., the in-loop filter indicator is set to on).

As shown in FIG. 7, the implementation of such techniques provides in-loop filter coding decisions 740. For example, the in-loop filter indicator is set to on for picture 710 in response to picture 710 being an I-picture and not a B2-picture, the in-loop filter indicator is set to off for picture 711 in response to picture 711 being a B2-picture, the in-loop filter indicator is set to on for picture 712 in response to picture 712 being a B1-picture and not a B2-picture, the in-loop filter indicator is set to off for picture 713 in response to picture 713 being a B2-picture, the in-loop filter indicator is set to on for picture 714 in response to picture 714 being a B-picture and not a B2-picture, the in-loop filter indicator is set to off for picture 715 in response to picture 715 being a B2-picture, the in-loop filter indicator is set to on for picture 716 in response to picture 716 being a B1-picture and not a B2-picture, the in-loop filter indicator is set to off for picture 717 in response to picture 717 being a B2-picture, and the in-loop filter indicator is set to on for picture 718 in response to picture 718 being a B0-picture and not a B2-picture.

Also as discussed with respect to FIG. 1, in other embodiments, coding structure adaptive loop filter decision module 104 may determine the picture type of the current picture and, if the current picture is a low level B-picture such that the low level B-picture is a non-reference B-picture or a reference B-picture that can only be referenced by non-reference B-pictures (e.g., a B1-picture or a B2-picture), coding structure adaptive loop filter decision module 104 sets the in-loop filter indicator current picture to off. Furthermore, in such embodiments, all other hierarchical B-structure picture types (e.g., I-pictures, B0-pictures, and B-pictures) are set as in-loop non-skip pictures (e.g., the in-loop filter indicator is set to on).

As shown in FIG. 7, the implementation of such techniques provides in-loop filter coding decisions 750. For example, the in-loop filter indicator is set to on for picture 710 in response to picture 710 being an I-picture and not a B2-picture or B1-picture, the in-loop filter indicator is set to off for picture 711 in response to picture 711 being a B2-picture, the in-loop filter indicator is set to off for picture 712 in response to picture 712 being a B1-picture, the in-loop filter indicator is set to off for picture 713 in response to picture 713 being a B2-picture, the in-loop filter indicator is set to on for picture 714 in response to picture 714 being a B-picture and not a B2 -picture or B1-picture, the in-loop filter indicator is set to off for picture 715 in response to picture 715 being a B2-picture, the in-loop filter indicator is set to off for picture 716 being a B1-picture, the in-loop filter indicator is set to off for picture 717 in response to picture 717 being a B2-picture, and the in-loop filter indicator is set to on for picture 718 in response to picture 718 being a B0-picture and not a B2-picture or B1-picture.

Returning to FIG. 1, as discussed, coding structure adaptive loop filter decision module 104 may determine whether in-loop filtering is to be performed for a current picture based on a coding structure associated with coding the group of pictures that includes a current picture. In some embodiments, system 100 implements video coding with a low delay coding structure. For example, such a low delay coding structure may restrict a display order and an encode order of a group of pictures to being the same and/or provide other coding restrictions. In such embodiments, coding structure adaptive loop filter decision module 104 determines whether in-loop filtering is to be performed for a current picture by applying in-loop filter skip and non-skip indicators at a fixed picture interval. The fixed picture interval may provide in-loop filter skip pictures at any suitable frequency such every other picture, every third picture, or even more frequently with in-loop filter non-skip pictures occurring every third or fourth picture or the like.

Figure 8:
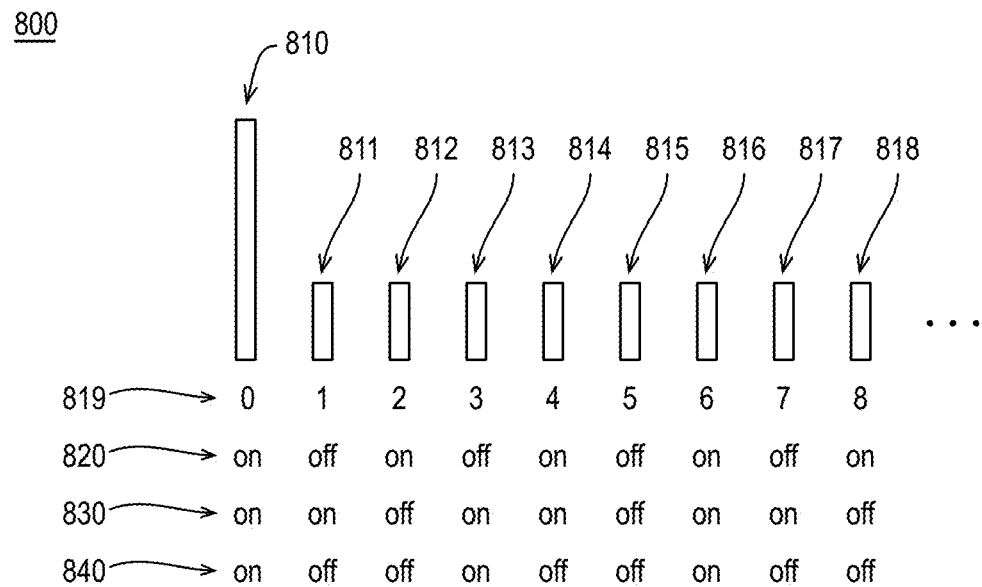
FIG. 8 illustrates an example group of pictures with a low delay coding structure.

FIG. 8 illustrates an example group of pictures 800 with a low delay coding structure, arranged in accordance with at least some implementations of the present disclosure. As shown in FIG. 8, group of pictures 800 includes pictures 810-818. In the illustrated example, group of pictures 800 is a group of pictures having a display order 819 and an encode order in the same order as pictures 810-818. Furthermore, group of pictures 800 includes two or more picture types such that picture 810 may be a high level picture or I-picture or reference picture or the like and pictures 811-818 may be low level pictures or non-reference pictures or the like. For example, group of pictures 800 is a group of pictures in an encoding context with a low delay coding structure. Although illustrated with particular details for the sake of clarity of presentation, group of pictures 800 may include any number of pictures of any suitable picture types in a suitable order.

As discussed with respect to FIG. 1, in some embodiments, coding structure adaptive loop filter decision module 104 determines whether in-loop filtering is to be performed for a current picture by applying in-loop filter skip and non-skip indicators at a fixed picture interval. As shown in FIG. 8, the implementation of such techniques at a fixed interval of every other picture provides for in-loop filter decisions 820. In such an embodiment, the in-loop filter indicator is set to on for picture 810 in response to picture 810 being a high level picture such as an I-picture or reference picture. Picture 810, as a high level picture may mark or provide a starting point for implementing in-loop filter skip and non-skip at a fixed picture intervals. As shown, the in-loop filter indicator is set to off for pictures 811, 813, 815, and 817 such that in-loop filtering is set to off in an every other picture manner based on an every other picture fixed picture interval and the in-loop filter indicator is set to on for pictures 812, 814, 816, 818 based on the every other picture fixed picture interval.

Also as discussed, the fixed picture interval may provide in-loop filtering skip pictures at any suitable frequency such every other picture (e.g., as shown with respect to in-loop filter decisions 820), every third picture, or even more frequently with in-loop filtering non-skip pictures occurring every third or fourth picture or the like. For example, in-loop filter decisions 830 illustrate an example where the in-loop filter indicator is set to off for every third picture (e.g., such that the in-loop filter indicator is set to off for pictures 812, 815, and 818 and the in-loop filter indicator is set to on for pictures 810, 811, 813, 814, 816, and 817). Furthermore, in-loop filter decisions 840 illustrate an example where the in-loop filter indicator is set to one for every third picture (e.g., such that the in-loop filter indicator is set to on for pictures 813 and 816 and the in-loop filter indicator is set to off for pictures 811, 812, 814, 815, 817, and 818).

Returning to FIG. 1, as discussed, coding structure adaptive loop filter decision module 104 may determine whether or not to perform in-loop filtering using any suitable technique or techniques. In some embodiments, system 100 implements video coding with an adaptive quantization parameter low delay coding structure. For example, such an adaptive quantization parameter low delay coding structure may restrict a display order and an encode order of a group of pictures to being the same but may provide for adaptive quantization parameters (e.g., lower QP for pictures for which higher quality is desired and higher QP for pictures for which lower quality is allowable). Such an adaptive quantization parameter low delay coding structure may allow for rate control module 101 and/or other modules of system 100 to provide different quantization parameters for different pictures of a group of pictures. In such embodiments, coding structure adaptive loop filter decision module 104 determines whether or not to apply in-loop filtering for a current or individual picture in response to the quantization parameter provided for a picture. In an embodiment, when a high quantization parameter is determined for a picture (e.g., via rate control module 101), coding structure adaptive loop filter decision module 104 set the picture as an in-loop filter skip picture and, when a low quantization parameter is determined for a picture (e.g., via rate control module 101), coding structure adaptive loop filter decision module 104 sets the picture as an in-loop filter skip picture.

Figure 9:
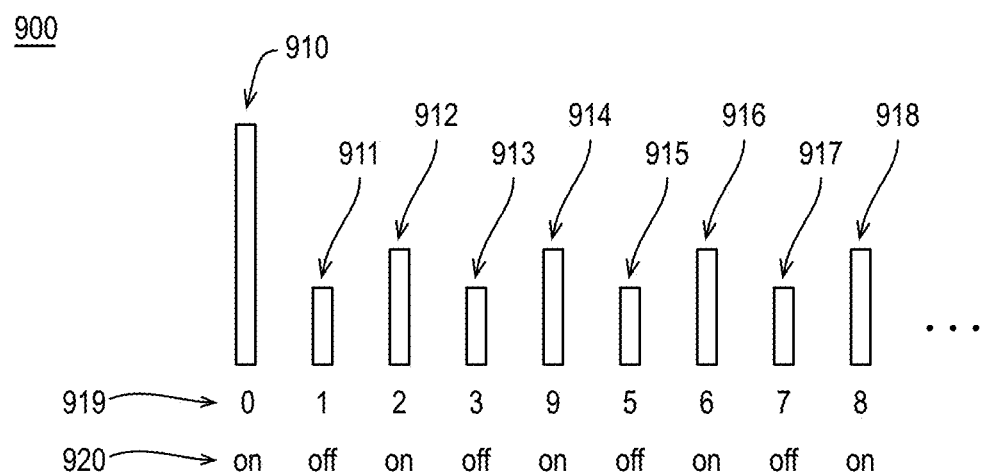
FIG. 9 illustrates an example group of pictures with an adaptive quantization parameter low delay coding structure.

FIG. 9 illustrates an example group of pictures 900 with an adaptive quantization parameter low delay coding structure, arranged in accordance with at least some implementations of the present disclosure. As shown in FIG. 9, group of pictures 900 includes pictures 910-918. In the illustrated example, group of pictures 900 is a group of pictures in a display order 919 and an encode order that is the same order as pictures 910-918. Furthermore, group of pictures 900 has two or more picture types such that picture 910 is a high level picture or I-picture or reference picture or the like and pictures 911-918 are low level pictures or non-reference pictures or the like. Furthermore, among pictures 911-918, some pictures are low quantization parameter pictures and other pictures are high quantization parameter pictures. In an embodiment, pictures 911, 913, 915, and 917 are high quantization parameter pictures (e.g., lower quality pictures) and pictures 912, 914, 916, and 918 are low quantization parameter pictures (e.g., higher quality pictures). Although illustrated with particular details for the sake of clarity of presentation, group of pictures 900 may include any number of pictures of any suitable picture types in a suitable order. In particular, in some examples, high and low quantization parameter pictures may not be alternate.

As discussed with respect to FIG. 1, in some examples, coding structure adaptive loop filter decision module 104 whether or not to apply in-loop filtering for a current or individual picture in response to the quantization parameter provided for a picture such that, when the quantization parameter associated with the picture is a high level (e.g., a high) quantization parameter in-loop filtering is skipped and, when the quantization parameter associated with the picture is a low level (e.g., a low) quantization parameter, in-loop filtering is applied. In such a manner, in-loop filter skip pictures and in-loop filter non-skip pictures track with the quantization parameter assigned to the picture such that high quality pictures are in-loop filter non-skip pictures and low quality pictures are in-loop filter skip pictures. In an embodiment, coding structure adaptive loop filter decision module 104 may determine in-loop filter skip and non-skip pictures as shown with respect to in-loop filter decisions 920 such that the in-loop filter indicator is set to off for pictures 911, 913, 915, and 917 and the in-loop filter indicator is set to on for pictures 910, 912, 914, 916, and 918.

Such settings may be provided using any suitable technique or techniques. In an embodiment, coding structure adaptive loop filter decision module 104 compares a picture quantization parameter to a threshold. When the quantization parameter compares favorably to the threshold, the in-loop filter indicator is set to off and, when the quantization parameter compares unfavorably to the threshold, the in-loop filter indicator is set to on. In an embodiment, coding structure adaptive loop filter decision module 104 compares a picture quantization parameter to a quantization parameter for an immediately prior picture in display order 919 such that when the picture quantization parameter is greater than the quantization parameter for the immediately prior picture, the in-loop filter indicator is changed to, or left at, off and, when the picture quantization parameter is less than the quantization parameter for the immediately prior picture, the in-loop filter indicator is changed to, or left at, on.

Returning to FIG. 1, as discussed, loop filter setting modules 108-111 provide loop filter indicators signal 126 for pictures of video 121 to loop filter processing module 112. If the in-loop filter indicator for a picture indicates in-loop filtering is to be skipped at the picture level, loop filter processing module 112 may skip CDEF and/or LRF processing for the picture and loop filter processing module 112 may provide the associated in-loop filter indicator via loop filter indicators and parameters signal 124 to entropy encoder 113, which entropy encodes the skip indicator for inclusion in bitstream 125. For example, such in-loop filtering indicators or flags or the like (e.g., indicating whether in-loop filtering is performed for pictures) may be included in a header of bitstream 125 such as a slice header or the like.

If loop filter indicators signal 126 indicates, for a picture, in-loop filtering is not performed, loop filter processing module 112 skips one or both of CDEF and/or LRF for the picture. If loop filter indicators signal 126 indicates, for a picture, in-loop filtering is to be performed, loop filter processing module 112 may process the picture using any suitable technique or techniques. In some embodiments, the in-loop filter non-skip picture is to its reference picture (e.g., a picture with reference to which the in-loop filter non-skip picture is being coded) and, if the in-loop filter non-skip picture matches its reference picture, the in-loop filter non-skip picture may be changed to an in-loop filter skip picture (e.g., the in-loop filter indicator may be changed from on to off for the picture). The determination as to whether the picture and the reference picture match may be made using any suitable technique or techniques. In some embodiments, the determination may be based on all coding units of the picture being motion estimation skip blocks or units. For example, after performing motion estimation coding, if all coding units of the picture are skip blocks or units (e.g., each block has a zero motion vector), the picture and the reference picture may be determined to match.

If an in-loop non-skip picture is changed to an in-loop filter skip picture based on the picture and the reference picture matching, such an indicator or flag is provided to entropy encoder 113 via loop filter indicators and parameters signal 124 for inclusion in bitstream 125 as discussed and in-loop filtering is not performed for the picture. If the current picture is not changed to an in-loop filter skip picture, the in-loop filter non-skip picture flag or indicator are provided to entropy encoder 113 via loop filter indicators and parameters signal 124 for inclusion in bitstream 125 and in-loop filtering is performed. For example, the in-loop filter indicator may be included in a slice header of bitstream 125 or the like. When in-loop filtering is performed, CDEF combinations and LRF filter coefficients and any other parameters necessary for performing in-loop filtering are determined. Such CDEF combinations and LRF filter coefficients are provided to entropy encoder 113 via loop filter indicators and parameters signal 124 for inclusion in bitstream 125.

Furthermore, loop filter processing module 112 may continue with coding unit level in-loop filter processing decisions for the in-loop filter non-skip picture. For example, a decision is made as to whether in-loop filtering is to be performed at the picture level (e.g., picture level in-loop filter indicator is set to on), adaptive coding unit level in-loop filter processing decisions may be applied to further simplify in-loop filtering processing.

In some embodiments, for an in-loop filtering non-skip picture, loop filter processing module 112 determines whether a coding unit (e.g., a super block or LRU) of the current in-loop filtering non-skip picture is in a static region (e.g., the coding unit of the current in-loop filtering non-skip picture has a zero motion vector) or a prediction residue (e.g., a motion prediction residue) between the coding unit of the current in-loop filtering non-skip picture and its reference coding unit (e.g., the coding unit from a reference picture being used to code the coding unit) is less than a threshold. If so, a coding unit in-loop filtering coding flag is set to skip for the coding unit (e.g., in-loop filtering is skipped such a super block or LRU). If not, a coding unit in-loop filter indicator may be set to on for the coding unit and CDEF or LRF is performed for the coding unit using any suitable technique or techniques. Such processing may be repeated for any or all coding units (e.g., super blocks or LRUs) of the picture and the resultant coding unit level in-loop filter indicators are provided to entropy encoder 113 via loop filter indicators and parameters signal 124 for entropy encoding and inclusion in bitstream 125.

In other embodiments, for an in-loop filtering non-skip picture, loop filter processing module 112 determines whether a coding unit (e.g., a super block or LRU) of the current in-loop filtering non-skip picture has a zero motion vector (e.g., a motion vector for the coding unit is a zero motion vector) and a quantization parameter associated with its reference coding unit (e.g., the coding unit from a reference picture being used to code the coding unit) compares favorably to a threshold. If so, a coding unit level in-loop filter indicator is set to skip for the coding unit and in-loop filter parameters (CDEF or LRF parameters) for the coding unit of the current in-loop filtering non-skip picture are copied from the reference coding unit (instead of being determined). For example, in-loop filtering parameters previously determined for the reference coding unit are copied for the current coding unit and provided via loop filter indicators and parameters signal 124 for entropy encoding via entropy encoder 113 and inclusion in bitstream 125. Such copying of in-loop filtering parameters provides computational savings.

The determination as to whether the coding unit of the current in-loop filtering non-skip picture is the same as its reference coding unit may be made using any suitable technique or techniques. In some embodiments, the coding unit of the current in-loop filtering non-skip picture is determined to be the same as its reference coding unit when the residue (e.g., difference) between the coding unit of the current in-loop filtering non-skip picture and the reference coding unit is less than a threshold. For example, the residue may be a sum of squares of the pixel-wise residual for the coding units.

The techniques discussed herein may provide effective and efficient compression of video data. Such techniques may provide computational efficiency and may be advantageously implemented via hardware. Furthermore, such techniques may provide in-loop filtering picture level and/or coding unit level skip decisions that reduce in-loop filtering processing and achieve similar subjective quality with respect to full in-loop filtering coding. Such techniques, when implemented via a device, provide for improved computation time, power usage, as well as improved objective and subjective video quality.

Figure 10:
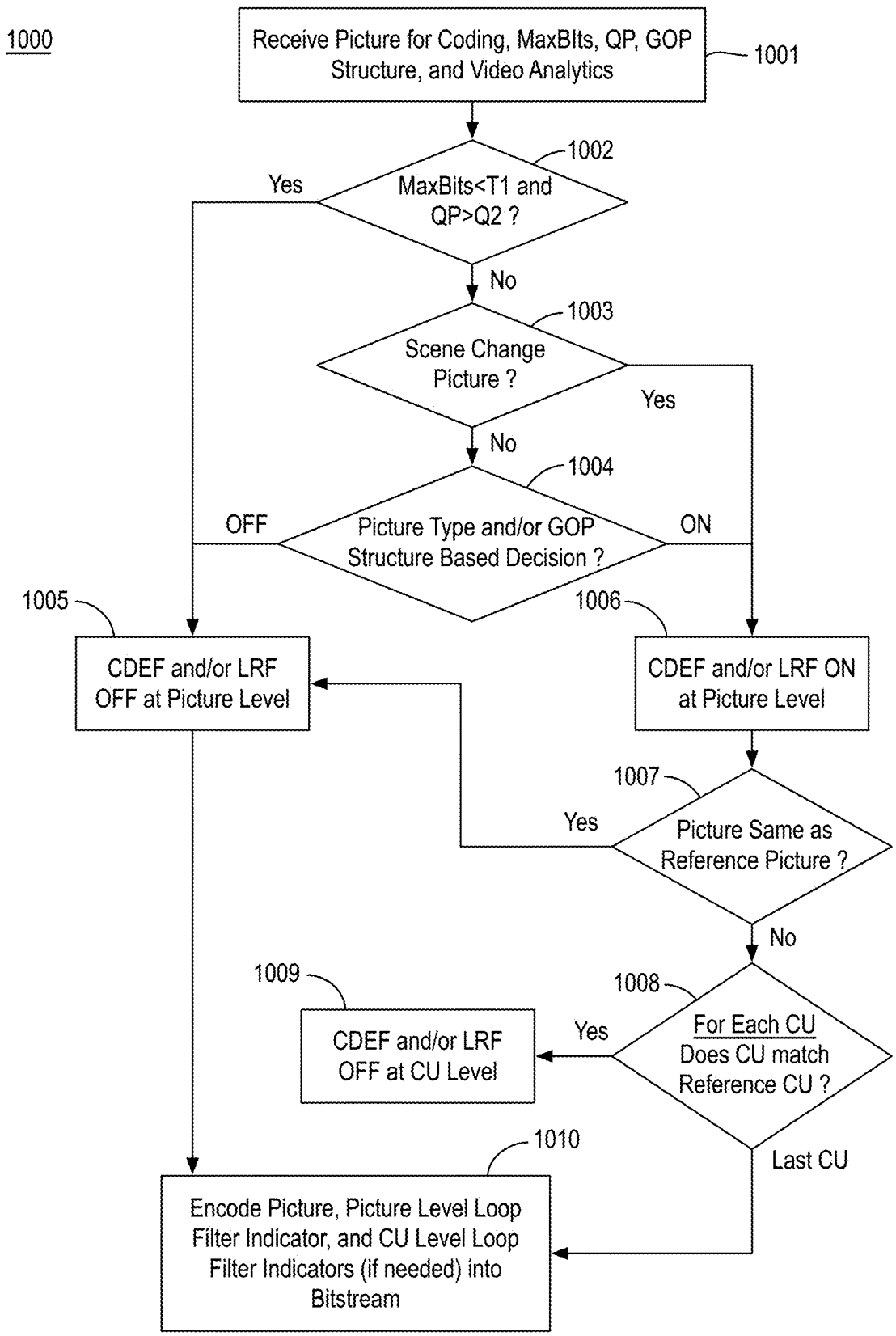
FIG. 10 is a flow diagram illustrating an example process for video coding including in-loop filtering picture level and coding unit level skip decisions.

FIG. 10 is a flow diagram illustrating an example process 1000 for video coding including in-loop filtering picture level and coding unit level skip decisions, arranged in accordance with at least some implementations of the present disclosure. Process 1000 may include one or more operations 1001-1011 as illustrated in FIG. 10. Process 1000 may be performed by a device (e.g., system 100 as discussed herein) to encode input video.

Process 1000 begins at operation 1001, where a picture for coding, a maximum coding bit limit for the picture, a picture level quantization parameter for the picture, and video analytics for the picture are received using any suitable technique or techniques. The maximum coding bit limit for the picture, a picture level quantization parameter for the picture, and video analytics for the picture may be generated using any suitable technique or techniques. In an embodiment, at the encoding of each picture, rate control is applied to determine the quantization parameter and maximum number of bits that can be used by the current picture.

Processing continues at decision operation 1002, where a determination is made as to whether the maximum coding bit limit compares unfavorably to a first threshold and the picture level quantization parameter compares favorably to a second threshold. If so, processing continues at operation 1005, where a picture level in-loop filter indicator is set to off for the picture. In an embodiment, the picture level in-loop filter indicator is a CDEF off. In an embodiment, the picture level in-loop filter indicator is an LRF off indicator. In an embodiment, the picture level in-loop filter indicator indicates both CDEF and LRF are off indicator. As discussed herein, the picture level in-loop filter indicator does not influence deblock filtering.

For example, if the maximum bits is less than a threshold T1 and the quantization parameter is greater than another threshold T2 for the current picture, the in-loop filter is set to be off at the picture level. For example, for rate control based in-loop filter on/off decision, under certain circumstances, it is advantageous to turn off the in-loop filter to prevent a buffer underflow in one-pass coding. As discussed two thresholds are used: a maximum coding bit limit threshold T1 and a quantization parameter threshold T2. In an embodiment, the maximum coding bit limit threshold is a picture resolution adaptive value such that the higher the resolution, the higher the value of the threshold. In an embodiment, the maximum coding bit limit threshold is determined as a constant multiplied with the total number of blocks (e.g., coding units) in the current picture. In an embodiment, the quantization parameter threshold T2 is a constant and may be in the range of, for example, 46 to 51 when the maximum quantization parameter is 55 or 235 to 245 when the maximum quantization parameter is 255.

If the maximum coding bit limit compares favorably to the first threshold or the picture level quantization parameter compares unfavorably to the second threshold, processing continues at decision operation 1003, where a determination is made as to whether the picture is a scene change picture. Such a determination may be made using any suitable technique or techniques discussed herein. In an embodiment, a decision as to whether the picture is a scene change picture is indicated via the video analytics received at operation 1001. If the picture is a scene change picture, processing continues at operation 1006, where a picture level in-loop filter indicator is set to on for the picture. In an embodiment, the picture level in-loop filter indicator is a CDEF on indicator. In an embodiment, the picture level in-loop filter indicator is an LRF on indicator. In an embodiment, the picture level in-loop filter indicator indicates both CDEF and LRF are on indicator. For example, if the current picture is detected as a scene-change picture, in-loop filter is set to be on at the picture level, which may be indicated in a slice header of a bitstream.

If the current picture is not a scene change picture, processing continues at decision operation 1004, where a determination is made as to whether in-loop filtering is to be performed (e.g., in-loop filter indicator on) or not (e.g., in-loop filter indicator off) for the current picture. Such a determination is made using any suitable technique or techniques discussed herein. For example, if the current picture is detected as a non-scene-change picture, a coding structure based adaptive in-loop filter on/off analysis is applied.

In an embodiment, when the current picture is an I-picture, the in-loop filter indicator is set to on. In an embodiment, when a hierarchical B coding structure is implemented, the in-loop filter is set as off for all the non-reference B-pictures (e.g., B2-pictures), and on otherwise. In another embodiment, when a hierarchical B coding structure is implemented, the in-loop filter is set as off for all the non-reference B-pictures (e.g., B2-pictures) and reference B-pictures that can only be referenced by non-reference B-pictures (e.g., B1-pictures), and on otherwise. In an embodiment, when a low delay coding structure is used (e.g., without B frames), the in-loop filter is set to on with a fixed picture interval. In an embodiment, the in-loop filter is set to on for pictures with an even index (e.g., picture number in an encode order beginning with a reference picture as a 0th picture) and off for pictures with an odd index. In an embodiment, when adaptive quantization parameter allocation is used with a low delay coding structure, the in-loop filter is set to on for good quality pictures (e.g., low QP pictures) and set to off for other frames (e.g., high QP pictures).

As shown, when the in-loop filter is set to off for the current picture, processing continues at operation 1005 and, when the in-loop filter is set to on for the current picture, processing continues at operation 1006, as discussed above. From operation 1006, processing continues at decision operation 1007, where a determination is made as to whether the current picture is the same as the reference picture for the current picture. If so, processing continues at operation 1005, where the in-loop filter is set to off (e.g., changed from on to off), as discussed. The determination as to whether the current picture is the same as the reference picture for the current picture may be made using any suitable technique or techniques. In some embodiments, the determination is based on all coding units of the picture being motion estimation skip blocks or units such that, after performing motion estimation coding, if all coding units of the picture are skip blocks or units (e.g., each block has a zero motion vector), the picture and the reference picture are deemed to match.

If the current picture and the reference picture are not deemed to be a match at decision operation 1007, processing continues at decision operation 1008, where a determination is made, for each coding unit (CU) of the picture, as to whether the coding unit matches its reference coding unit. If so, in an embodiment, at operation 1009, an in-loop filter indicator for the coding unit (e.g., a coding unit level in-loop filter indicator) is set to off and in-loop filtering (e.g., in-loop filter parameter estimation and parameter encoding) are skipped for coding unit. In another embodiment, at operation 1009, when the coding unit matches its reference coding unit, in-loop filtering is performed for the current block using the in-loop filter parameters from the reference coding unit (e.g., the collocated coding unit in the reference picture). The determination as to whether the coding unit matches its reference coding unit may be made using any suitable technique or techniques. In some embodiments, the coding unit being in a pure static region or with a motion prediction residue that is almost zero (e.g., sum of squares or absolute values of pixel-wise residuals is less than a threshold) and without quantization parameter changes (e.g., with respect to neighboring coding units) indicates the coding unit matches its reference coding unit. In an embodiment, the coding unit in-loop filter is set to off when the coding unit is located in pure static region or the motion prediction residue is almost zero without quantization parameter changes. In an embodiment, when the motion vector for the coding unit is zero and its reference coding unit has a quantization parameter larger than a threshold, the current coding unit skips in-loop filter parameter estimation and reuses the in-loop filter parameters of its collocated block in the reference frame.

As shown, when at decision operation 1008 completes processing all coding units (as indicated by "Last CU") or from operation 1005, processing continues at operation 1010, where the picture, picture level in-loop filter indicator, and coding unit level in-loop filter indicators (if any) are encoded into a bitstream such as a standards compliant bitstream. As will be appreciated, in-loop filtering is only performed for those pictures and coding units having in-loop filter indicators set to on, which may save substantial processing resources and time.

Figure 11:
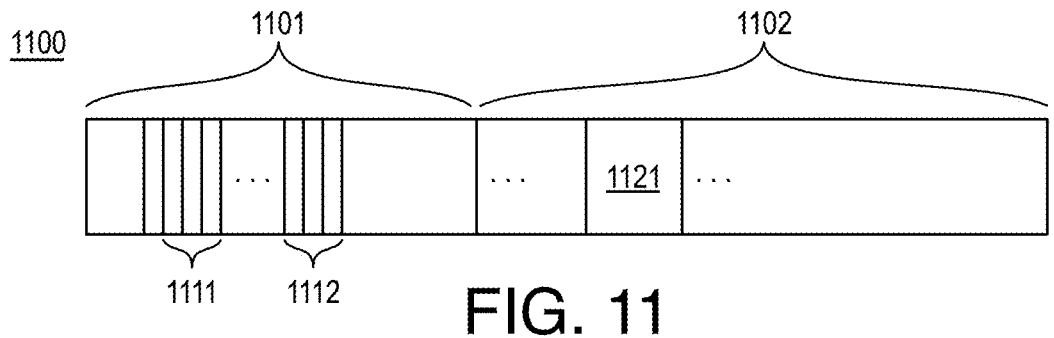
FIG. 11 illustrates an example bitstream.

FIG. 11 illustrates an example bitstream 1100, arranged in accordance with at least some implementations of the present disclosure. In some examples, bitstream 1100 may correspond to bitstream 125 as shown in FIG. 1. As shown in FIG. 11, in some embodiments, bitstream 1100 includes a header portion 1101 and a data portion 1102. Header portion 1101 may include indicators such as picture level in-loop filter indicators 1111 and other indicators 1112. For example, in-loop filter indicators 1111 may include indicators or flags or bits or the like indicating whether or not in-loop filtering (e.g., decoding with CDEF and/or LRF processing) is to be performed for particular pictures of video. For example, picture level in-loop filter indicators 1111 may include in-loop indicators or flags for particular pictures of video. Furthermore, data portion 1102 may include in-loop filter parameter data 1121 for in-loop filter non-skip pictures indicated as in-loop filter coded via in-loop filter indicators 1111. For example, in-loop filter parameter data 1121 may include CDEF parameters, LRF parameters, etc. Furthermore, in-loop filter parameter data 1121 may include coding unit level in-loop filter indicators as discussed herein. Such in-loop filter parameter data 1121 may include, for example, parameters for providing filters for reconstructing pictures or the like.

Figure 12:
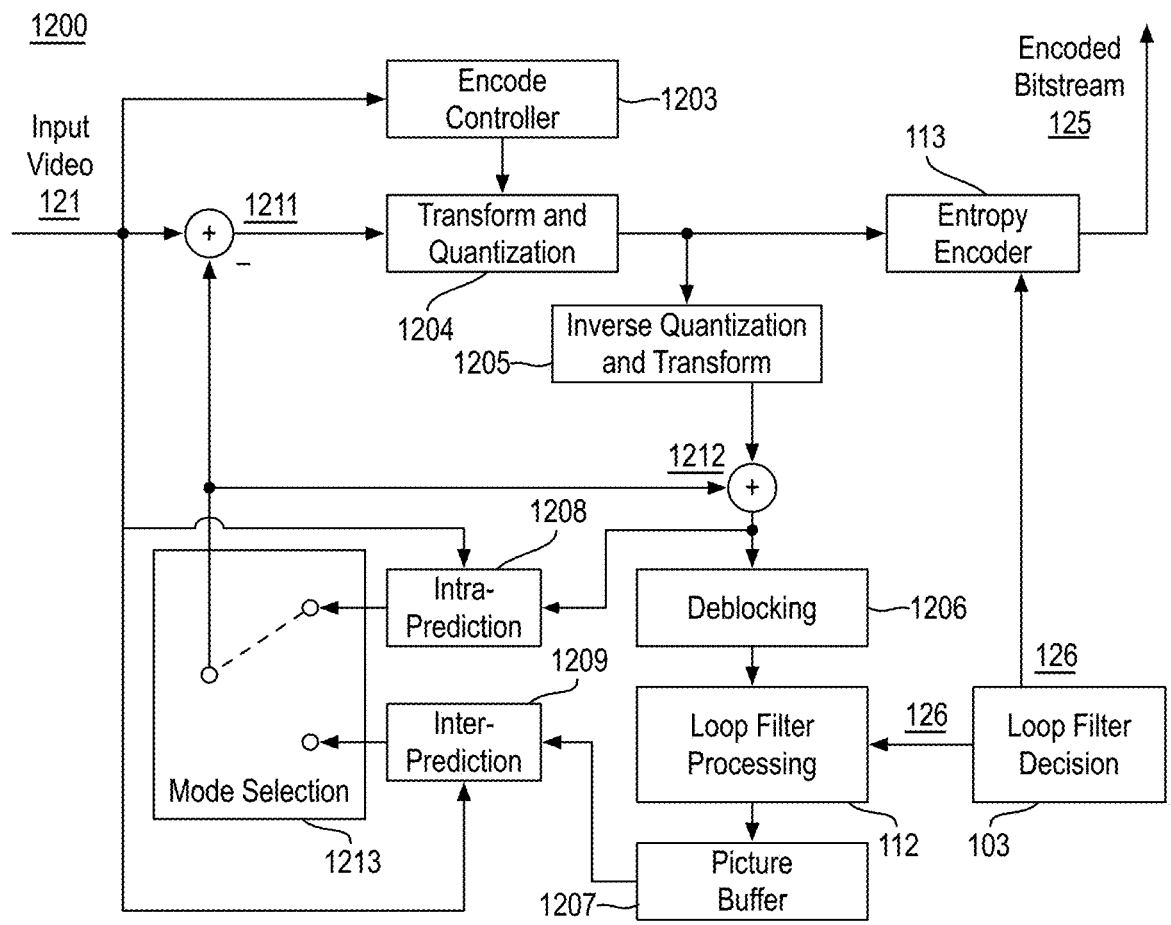
FIG. 12 illustrates a block diagram of an example encoder integrating adaptive in-loop filtering.

FIG. 12 illustrates a block diagram of an example encoder 1200 integrating adaptive in-loop filtering, arranged in accordance with at least some implementations of the present disclosure. As shown, encoder 1200 includes loop filter decision module 103, loop filter processing module 112, an encode controller 1203, a transform and quantization module 1204, an inverse quantization and transform module 1205, a deblocking module 1206, a picture buffer 1207, an intra-prediction module 1208, an inter-prediction module 1209, a mode selection module 1213, and entropy encoder 113. Encoder 1200 may include additional modules such as other modules of system 100 and/or interconnections that are not shown for the sake of clarity of presentation.

As shown in FIG. 12, encoder 1200 receives input video 121. Input video 121 may be in any suitable format and may be received via any suitable technique such as video capture or via memory or the like. Furthermore, input video 121 may be processed (not shown) to determine portions of video frames (e.g., super blocks, loop restoration units, blocks, transform blocks, or any other portion of a video frame). As shown, input video 121 may be provided to encode controller 1203, intra-prediction module 1208, and inter-prediction module 1209. The coupling to intra-prediction module 1208 or inter-prediction module 1209 may be made via mode selection module 1213 as shown. For example, mode selection module 1213 may make final mode decisions for portions of video frames of input video 121.

In some embodiments, as discussed with respect to FIG. 1, encoder 1200 may include rate control module 101 and video analysis module 102. As discussed, based on evaluation of input video, in-loop filtering decisions are made at the picture and/or coding unit level such that in-loop filter processing may be selectively implemented or bypassed according to loop filter indicators signal 126 and/or further analysis of those pictures for which the in-loop filter indicator is on (as performed by loop filter processing module 112).

As shown, mode selection module 1213 (e.g., via a switch), may select, for a coding unit or block or the like between a best intra-prediction mode and a best inter-prediction mode based on minimum coding cost or the like. Based on the mode selection, a predicted portion of the video frame may be differenced via differencer 1211 with the original portion of the video frame (e.g., of input video 121) to generate a residual. The residual may be transferred to transform and quantization module 1204, which may transform (e.g., via a discrete cosine transform or the like) the residual to determine transform coefficients and quantize the transform coefficients using the frame level QP discussed herein. The quantized transform coefficients may be encoded via entropy encoder 113 into encoded bitstream 125. Other data, such as motion vector residuals, modes data, transform size data, or the like may also be encoded and inserted into encoded bitstream 125 for the portion of the video frame.

Furthermore, the quantized transform coefficients may be inverse quantized and inverse transformed via inverse quantization and transform module 1205 to generate a reconstructed residual. The reconstructed residual may be combined with the aforementioned predicted portion at adder 1212 to form a reconstructed portion, which may be deblocked via deblocking module 1206 and optionally in-loop filtered (e.g., using CDEF and/or LRF techniques) to generate a reconstructed picture. The reconstructed picture is then saved to picture buffer 1207 and used for encoding other portions of the current or other video frames. Such processing may be repeated for each video frame of input video 121.

Figure 13:
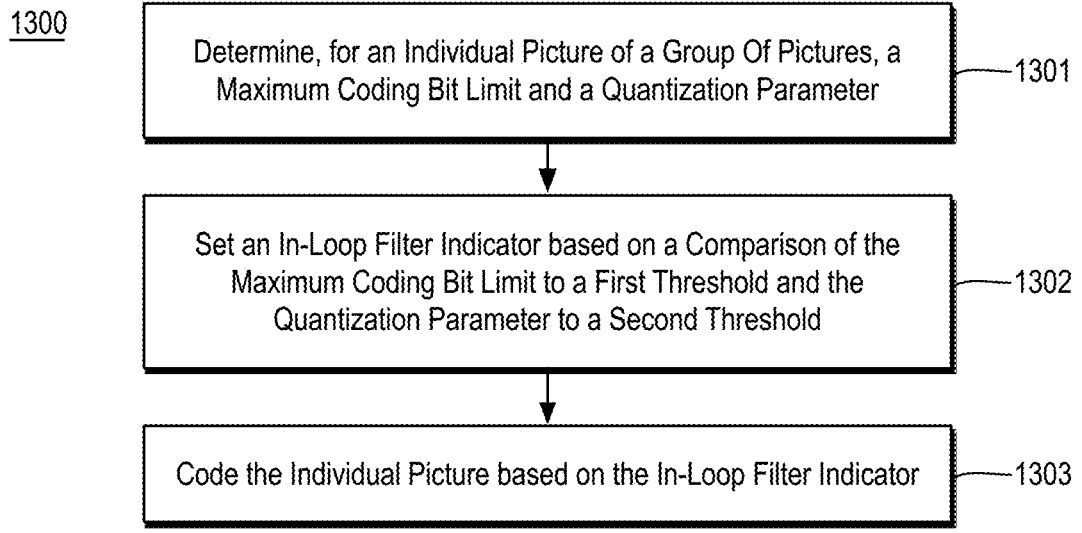
FIG. 13 is a flow diagram illustrating an example process for video coding including adaptively enabling and disabling in-loop filtering.

FIG. 13 is a flow diagram illustrating an example process 1300 for video coding including adaptively enabling and disabling in-loop filtering, arranged in accordance with at least some implementations of the present disclosure. Process 1300 may include one or more operations 1301-1303 as illustrated in FIG. 13. Process 1300 may form at least part of a video coding process. By way of non-limiting example, process 1300 may form at least part of a video coding process as performed by any device or system as discussed herein such as system 100 or encoder 1200. Furthermore, process 1300 will be described herein with reference to system 1400 of FIG. 14.

Figure 14:
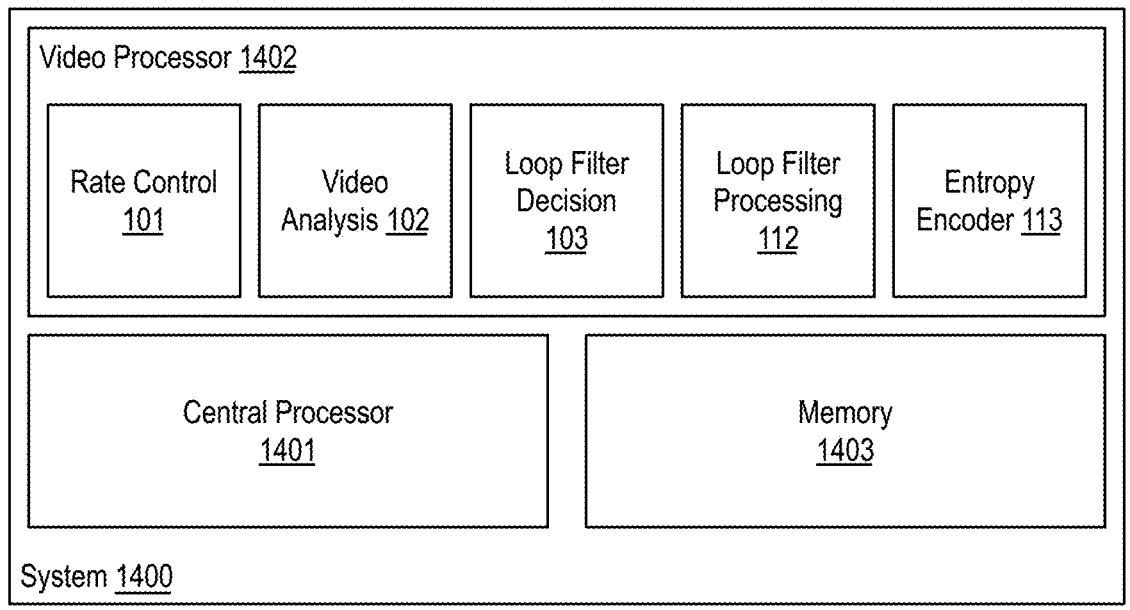
FIG. 14 is an illustrative diagram of an example system for video coding including adaptively enabling and disabling in-loop filtering.

FIG. 14 is an illustrative diagram of an example system 1400 for video coding including adaptively enabling and disabling in-loop filtering, arranged in accordance with at least some implementations of the present disclosure. As shown in FIG. 14, system 1400 may include a central processor 1401, a video processor 1402, and a memory 1403. Also as shown, video processor 1402 may include or implement rate control module 101, video analysis module 102, loop filter decision module 103, loop filter processing module 112, and entropy encoder 113. In an embodiment, memory 1403 implements picture buffer 1207. Furthermore, in the example of system 1400, memory 1403 may store video data or related content such as picture data, coding unit data, maximum coding bit limit data, quantization parameters, scene change data, group of picture data, picture type data, bitstream data, and/or any other data as discussed herein.

As shown, in some embodiments, rate control module 101, video analysis module 102, loop filter decision module 103, loop filter processing module 112, and entropy encoder 113 are implemented via video processor 1402. In other embodiments, one or more or portions of rate control module 101, video analysis module 102, loop filter decision module 103, loop filter processing module 112, and entropy encoder 113 are implemented via central processor 1401 or another processing unit such as an image processor, a graphics processor, or the like.

Video processor 1402 may include any number and type of video, image, or graphics processing units that may provide the operations as discussed herein. Such operations may be implemented via software or hardware or a combination thereof. For example, video processor 1402 may include circuitry dedicated to manipulate pictures, picture data, or the like obtained from memory 1403. Central processor 1401 may include any number and type of processing units or modules that may provide control and other high level functions for system 1400 and/or provide any operations as discussed herein. Memory 1403 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1403 may be implemented by cache memory.

In an embodiment, one or more or portions of rate control module 101, video analysis module 102, loop filter decision module 103, loop filter processing module 112, and entropy encoder 113 are implemented via an execution unit (EU). The EU may include, for example, programmable logic or circuitry such as a logic core or cores that may provide a wide array of programmable logic functions. In an embodiment, one or more or portions of rate control module 101, video analysis module 102, loop filter decision module 103, loop filter processing module 112, and entropy encoder 113 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 13, process 1300 may begin at operation 1301, where, for an individual picture of a group of pictures, a maximum coding bit limit and a quantization parameter are determined. The maximum coding bit limit and the quantization parameter may be generated using any suitable technique or techniques.

Processing continues at operation 1302, where an in-loop filter indicator for the individual picture is set based at least in part on a comparison of the maximum coding bit limit to a first threshold and the quantization parameter to a second threshold. In an embodiment, the in-loop filter indicator for the individual picture is set to off when maximum coding bit limit compares unfavorably to the first threshold and the quantization parameter compares favorably to the second threshold.

In an embodiment, when the maximum coding bit limit compares favorably to the first threshold or the quantization parameter compares unfavorably to the second threshold, process 1300 further includes determining whether the individual picture is a scene change picture and setting, when the individual picture is determined to be a scene change picture, the in-loop filter indicator to on.

In an embodiment, when the maximum coding bit limit compares favorably to the first threshold or the quantization parameter compares unfavorably to the second threshold, process 1300 further includes setting the in-loop filter indicator for the individual picture based on a coding structure associated with coding the group of pictures. In an embodiment, the coding structure is a hierarchical B structure, the individual picture is a non-reference B-picture, and setting the in-loop filter indicator for the individual picture comprises setting the in-loop filter indicator to off in response to the individual picture being a non-reference B-picture. In an embodiment, the coding structure is a hierarchical B structure, the individual picture comprises at least one of a non-reference B-picture or a reference B-picture that can only be referenced by non-reference B-pictures, and setting the in-loop filter indicator for the individual picture comprises setting the in-loop filter indicator to off in response to the individual picture being a non-reference B-picture or a reference B-picture that can only be referenced by non-reference B-pictures. In an embodiment, the coding structure is a low delay coding structure having a constant maximum coding bit limit for pictures other than a first temporal picture of the group of pictures and setting the in-loop filter indicator for the individual picture comprises setting in-loop filter indicators to off for the group of pictures at a fixed picture interval. In an embodiment, the coding structure is an adaptive quantization parameter low delay coding structure and setting in-loop filter indicator for the individual picture comprises setting the in-loop filter indicator to off when a high quantization parameter is associated with the individual picture and setting the in-loop filter indicator to on when a low quantization parameter is associated with the individual picture. In an embodiment, the coding structure includes at least one I-picture, the individual picture is an I-picture, and setting the in-loop filter indicator comprises setting the in-loop filter indicator to on in response to the individual picture being an I-picture.

In an embodiment, when the in-loop filter indicator is set to on for the individual picture, process 1300 further includes determining the individual picture matches a reference picture associated with the individual picture and setting, prior to coding the individual picture, the in-loop filter indicator for the individual picture to off in response to the individual picture matching the reference picture.

In an embodiment, when the in-loop filter indicator is set to on for the individual picture, process 1300 further includes determining, for a coding unit of the individual picture, at least one of a motion vector associated with the coding unit is a zero motion vector and/or a prediction residue associated with the coding compares unfavorably to a third threshold, setting a coding unit level in-loop filter indicator for the coding unit to off in response to the coding unit having a zero vector motion vector and/or a prediction residue that compares unfavorably to the third threshold, and skipping in-loop filtering for the coding unit in response to the coding unit level in-loop filter indicator being off for the coding unit.

In an embodiment, when the in-loop filter indicator is set to on for the individual picture, process 1300 further includes determining, for a coding unit of the individual picture, a motion vector associated with the coding unit is a zero motion vector and a reference coding unit corresponding to the coding unit has a quantization parameter that compares favorably to a third threshold, setting a coding unit level in-loop filter indicator for the coding unit to skip in response to the coding unit having a zero vector motion vector and/or a prediction residue that compares unfavorably to the third threshold, skipping in-loop filter selection for the coding unit in response to the coding unit level in-loop filter indicator being skipped for the coding unit, and performing in-loop filtering for the coding unit using in-loop filter parameters from a reference coding unit.

Processing continues at operation 1303, where the individual picture is coded based at least in part on the in-loop filter indicator to generate a bitstream. For example, when the in-loop filter indicator is set to off, one or both of constrained directional enhancement filtering or loop restoration filtering are skipped for the individual picture. When the in-loop filter indicator is set to on, one or both of constrained directional enhancement filtering or loop restoration filtering are applied for the individual picture with the caveat that some coding units may be skipped. In an embodiment, the bitstream is an Alliance for Open Media compliant bitstream, and the in-loop filter indicator indicates whether or not to implement at least one of a constrained directional enhancement filter or a loop restoration filter for all coding units of the individual picture.

Process 1300 may be repeated any number of times either in series or in parallel for any number of pictures or video segments or the like. As discussed, process 1300 may provide for video encoding including constrained direction enhancement filter selection.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 15:
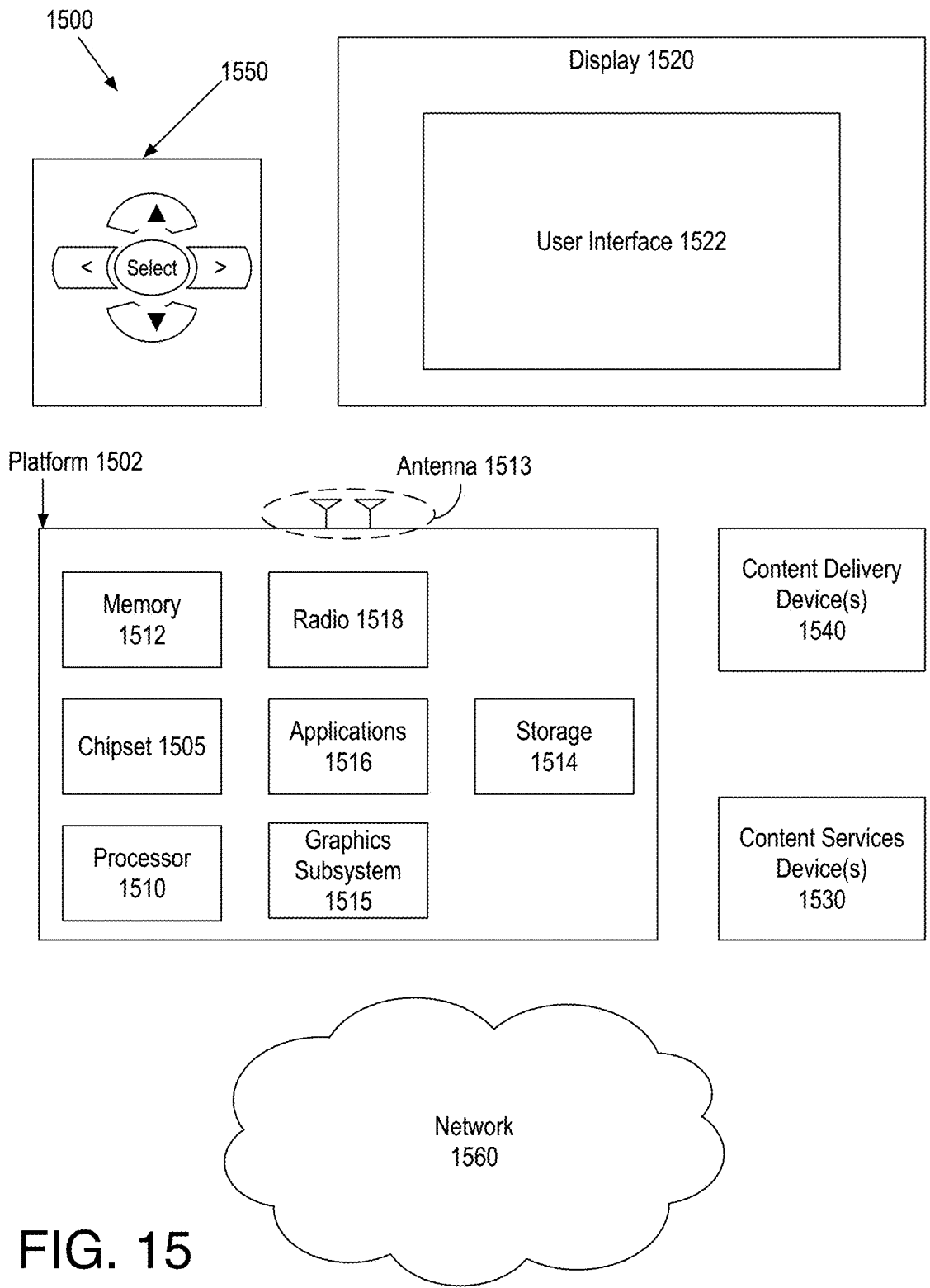
FIG. 15 is an illustrative diagram of an example system.

FIG. 15 is an illustrative diagram of an example system 1500, arranged in accordance with at least some implementations of the present disclosure. In various implementations, system 1500 may be a mobile system although system 1500 is not limited to this context. For example, system 1500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1500 includes a platform 1502 coupled to a display 1520. Platform 1502 may receive content from a content device such as content services device(s) 1530 or content delivery device(s) 1540 or other similar content sources. A navigation controller 1550 including one or more navigation features may be used to interact with, for example, platform 1502 and/or display 1520. Each of these components is described in greater detail below.

In various implementations, platform 1502 may include any combination of a chipset 1505, processor 1510, memory 1512, antenna 1513, storage 1514, graphics subsystem 1515, applications 1516 and/or radio 1518. Chipset 1505 may provide intercommunication among processor 1510, memory 1512, storage 1514, graphics subsystem 1515, applications 1516 and/or radio 1518. For example, chipset 1505 may include a storage adapter (not depicted) capable of providing intercommunication with storage 1514.

Processor 1510 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1510 may be dual-core processor(s), dual-core mobile processor(s), and so forth.

Memory 1512 may be implemented as a volatile memory device such as, but not limited to, a Random Access Memory (RAM), Dynamic Random Access Memory (DRAM), or Static RAM (SRAM).

Storage 1514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1514 may include technology to increase the storage performance enhanced protection for valuable digital media when multiple hard drives are included, for example.

Graphics subsystem 1515 may perform processing of images such as still or video for display. Graphics subsystem 1515 may be a graphics processing unit (GPU) or a visual processing unit (VPU), for example. An analog or digital interface may be used to communicatively couple graphics subsystem 1515 and display 1520. For example, the interface may be any of a High-Definition Multimedia Interface, DisplayPort, wireless HDMI, and/or wireless HD compliant techniques. Graphics subsystem 1515 may be integrated into processor 1510 or chipset 1505. In some implementations, graphics subsystem 1515 may be a stand-alone device communicatively coupled to chipset 1505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1518 may operate in accordance with one or more applicable standards in any version.

In various implementations, display 1520 may include any television type monitor or display. Display 1520 may include, for example, a computer display screen, touch screen display, video monitor, television-like device, and/or a television. Display 1520 may be digital and/or analog. In various implementations, display 1520 may be a holographic display. Also, display 1520 may be a transparent surface that may receive a visual projection. Such projections may convey various forms of information, images, and/or objects. For example, such projections may be a visual overlay for a mobile augmented reality (MAR) application. Under the control of one or more software applications 1516, platform 1502 may display user interface 1522 on display 1520.

In various implementations, content services device(s) 1530 may be hosted by any national, international and/or independent service and thus accessible to platform 1502 via the Internet, for example. Content services device(s) 1530 may be coupled to platform 1502 and/or to display 1520. Platform 1502 and/or content services device(s) 1530 may be coupled to a network 1560 to communicate (e.g., send and/or receive) media information to and from network 1560. Content delivery device(s) 1540 also may be coupled to platform 1502 and/or to display 1520.

In various implementations, content services device(s) 1530 may include a cable television box, personal computer, network, telephone, Internet enabled devices or appliance capable of delivering digital information and/or content, and any other similar device capable of uni-directionally or bi-directionally communicating content between content providers and platform 1502 and/display 1520, via network 1560 or directly. It will be appreciated that the content may be communicated uni-directionally and/or bi-directionally to and from any one of the components in system 1500 and a content provider via network 1560. Examples of content may include any media information including, for example, video, music, medical and gaming information, and so forth.

Content services device(s) 1530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1502 may receive control signals from navigation controller 1550 having one or more navigation features. The navigation features of may be used to interact with user interface 1522, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1520) by movements of a pointer, cursor, focus ring, or other visual indicators displayed on the display. For example, under the control of software applications 1516, the navigation features located on navigation may be mapped to virtual navigation features displayed on user interface 1522, for example. In various embodiments, may not be a separate component but may be integrated into platform 1502 and/or display 1520. The present disclosure, however, is not limited to the elements or in the context shown or described herein.

In various implementations, drivers (not shown) may include technology to enable users to instantly turn on and off platform 1502 like a television with the touch of a button after initial boot-up, when enabled, for example. Program logic may allow platform 1502 to stream content to media adaptors or other content services device(s) 1530 or content delivery device(s) 1540 even when the platform is turned "off." In addition, chipset 1505 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1500 may be integrated. For example, platform 1502 and content services device(s) 1530 may be integrated, or platform 1502 and content delivery device(s) 1540 may be integrated, or platform 1502, content services device(s) 1530, and content delivery device(s) 1540 may be integrated, for example. In various embodiments, platform 1502 and display 1520 may be an integrated unit. Display 1520 and content service device(s) 1530 may be integrated, or display 1520 and content delivery device(s) 1540 may be integrated, for example. These examples are not meant to limit the present disclosure.

In various embodiments, system 1500 may be implemented as a wireless system, a wired system, or a combination of both. When implemented as a wireless system, system 1500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 15.

Figure 16:
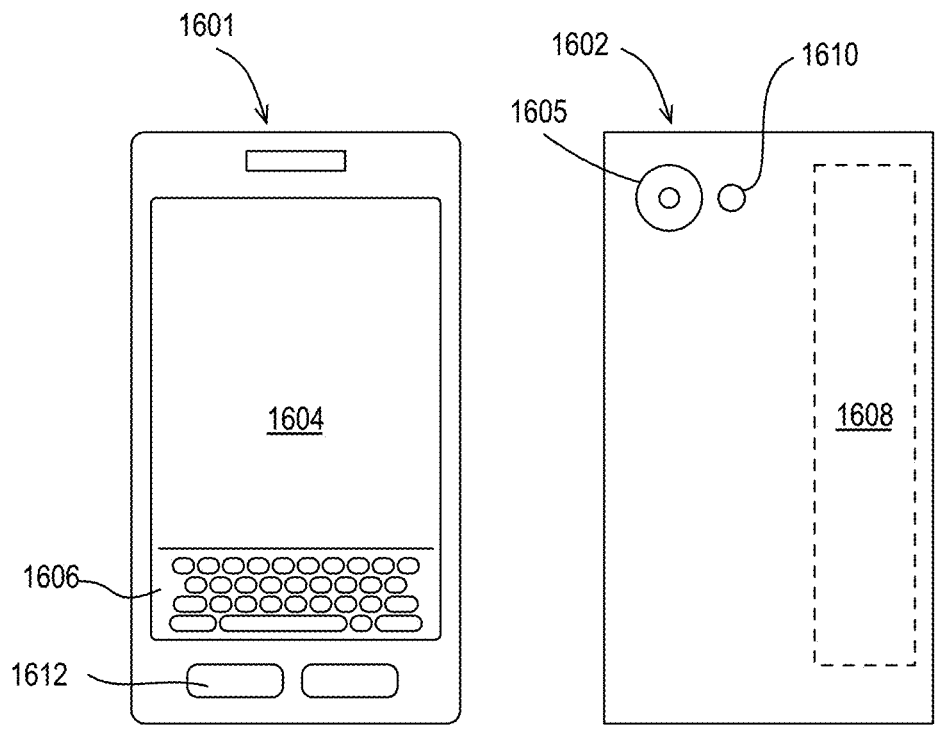
FIG. 16 illustrates an example device, all arranged in accordance with at least some implementations of the present disclosure.

As described above, system 1500 may be embodied in varying physical styles or form factors. FIG. 16 illustrates an example small form factor device 1600, arranged in accordance with at least some implementations of the present disclosure. In some examples, system 1500 may be implemented via device 1600. In other examples, system 100 or portions thereof may be implemented via device 1600. In various embodiments, for example, device 1600 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 16, device 1600 may include a housing with a front 1601 and a back 1602. Device 1600 includes a display 1604, an input/output (I/O) device 1606, and an integrated antenna 1608. Device 1600 also may include navigation features 1612. I/O device 1606 may include any suitable I/O device for entering information into a mobile computing device. Examples for I/O device 1606 may include an alphanumeric keyboard, a numeric keypad, a touch pad, input keys, buttons, switches, microphones, speakers, voice recognition device and software, and so forth. Information also may be entered into device 1600 by way of microphone (not shown), or may be digitized by a voice recognition device. As shown, device 1600 may include a camera 1605 (e.g., including a lens, an aperture, and an imaging sensor) and a flash 1610 integrated into back 1602 (or elsewhere) of device 1600. In other examples, camera 1605 and flash 1610 may be integrated into front 1601 of device 1600 or both front and back cameras may be provided. Camera 1605 and flash 1610 may be components of a camera module to originate image data processed into streaming video that is output to display 1604 and/or communicated remotely from device 1600 via antenna 1608 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A video coding system comprising:
a memory to store first and second pictures of first and second groups of pictures, respectively, of video for coding; and
a processor coupled to the memory, the processor to:
determine, for the first and second pictures, first and second picture level maximum coding bit limits and picture level quantization parameters, respectively;
set a first picture level in-loop filter indicator for the first picture to off, to indicate one of constrained directional enhancement filtering or loop restoration filtering is to be bypassed for the first picture, responsive to the first picture level maximum coding bit limit comparing unfavorably to a first threshold and the first picture level quantization parameter comparing favorably to a second threshold;
set a second picture level in-loop filter indicator for the second picture based at least in part on a comparison of the second picture level maximum coding bit limit to the first threshold and the second picture level quantization parameter to the second threshold; and
code the first and second pictures based at least in part on the first and second picture level in-loop filter indicators to generate a bitstream.

2. The video coding system of claim 1, wherein the bitstream comprises an Alliance for Open Media compliant bitstream.

3. The video coding system of claim 1, wherein, responsive to the second picture level maximum coding bit limit comparing favorably to the first threshold or the second picture level quantization parameter comparing unfavorably to the second threshold, the processor is further to:
determine whether the second picture is a scene change picture; and
set the second picture level in-loop filter indicator to on responsive to the second picture being a scene change picture.

4. The video coding system of claim 1, wherein, responsive to the second picture level maximum coding bit limit comparing favorably to the first threshold or the second picture level quantization parameter comparing unfavorably to the second threshold, the processor is further to:
set the second picture level in-loop filter indicator for the second picture based on a coding structure associated with coding the second group of pictures.

5. The video coding system of claim 4, wherein the coding structure comprises a hierarchical B structure, the second picture is a non-reference B-picture, and the processor to set the second picture level in-loop filter indicator for the second picture comprises the processor to set the second picture level in-loop filter indicator to off responsive to the second picture being a non-reference B-picture.

6. The video coding system of claim 4, wherein the coding structure comprises a hierarchical B structure, the second picture is a non-reference B-picture or a reference B-picture that can only be referenced by non-reference B-pictures, and the processor to set the second picture level in-loop filter indicator for the second picture comprises the processor to set the second picture level in-loop filter indicator to off responsive to the second picture being a non-reference B-picture or a reference B-picture that can only be referenced by non-reference B-pictures.

7. The video coding system of claim 4, wherein the coding structure comprises a low delay coding structure having a constant maximum coding bit limit for pictures other than a first temporal picture of the second group of pictures and the processor to set the second picture level in-loop filter indicator for the second picture comprises the processor to set picture level in-loop filter indicators to off for the second group of pictures at a fixed picture interval.

8. The video coding system of claim 4, wherein the coding structure comprises an adaptive quantization parameter low delay coding structure and the processor to set the second picture level in-loop filter indicator for the second picture comprises the processor to set the second picture level in-loop filter indicator to off responsive to a high quantization parameter being associated with the second picture and to set the second picture level in-loop filter indicator to on responsive to a low quantization parameter being associated with the second picture.

9. The video coding system of claim 4, wherein the coding structure comprises at least one I-picture, the second picture is an I-picture, and the processor to set the second picture level in-loop filter indicator comprises the processor to set the second picture level in-loop filter indicator to on responsive to the individual picture being an I-picture.

10. The video coding system of claim 1, wherein, responsive to the second picture level in-loop filter indicator being set to on based on the comparison of the second picture level maximum coding bit limit to the first threshold and the second picture level quantization parameter to the second threshold, the processor is further to:
determine the second picture matches a reference picture associated with the second picture; and
set, prior to coding the second picture, the second picture level in-loop filter indicator for the second picture to off responsive to the individual picture matching the reference picture.

11. The video coding system of claim 1, wherein, responsive to the second picture level in-loop filter indicator being set to on based on the comparison of the second picture level maximum coding bit limit to the first threshold and the second picture level quantization parameter to the second threshold, the processor is further to:

determine, for a coding unit of the second picture, at least one of a motion vector associated with the coding unit is a zero motion vector or a prediction residue associated with the coding compares favorably to a third threshold;

set a coding unit level in-loop filter indicator for the coding unit to off responsive to the coding unit having a zero vector motion vector or a prediction residue that compares unfavorably to the third threshold; and skip in-loop filtering for the coding unit responsive to the coding unit level in-loop filter indicator being off for the coding unit.

12. The video coding system of claim 1, wherein, responsive to the second picture level in-loop filter indicator being set to on based on the comparison of the second picture level maximum coding bit limit to the first threshold and the second picture level quantization parameter to the second threshold, the processor is further to:

determine, for a coding unit of the second picture, a motion vector associated with the coding unit is a zero motion vector and a reference coding unit corresponding to the coding unit has a quantization parameter that compares favorably to a third threshold;

set a coding unit level in-loop filter indicator for the coding unit to skip responsive to the coding unit having a zero vector motion vector and the coding unit having a quantization parameter that compares favorably to the third threshold;

skip in-loop filter selection for the coding unit responsive to the coding unit level in-loop filter indicator being skip for the coding unit; and perform in-loop filtering for the coding unit using in-loop filter parameters from a reference coding unit.

13. A computer-implemented method for video coding comprising:

determining, for first and second pictures of first and second groups of pictures, respectively, first and second picture level maximum coding bit limits and picture level quantization parameters, respectively;

setting a first picture level in-loop filter indicator for the first picture to off, to indicate one of constrained directional enhancement filtering or loop restoration filtering is to be bypassed for the first picture, responsive to the first picture level maximum coding bit limit comparing unfavorably to a first threshold and the first picture level quantization parameter comparing favorably to a second threshold;

setting a second picture level in-loop filter indicator for the second picture based at least in part on a comparison of the second picture level maximum coding bit limit to the first threshold and the second picture level quantization parameter to the second threshold; and coding the first and second pictures based at least in part on the first and second picture level in-loop filter indicators to generate a bitstream.

14. The method of claim 13, wherein, responsive to the second picture level maximum coding bit limit comparing favorably to the first threshold or the second picture level quantization parameter comparing unfavorably to the second threshold, the method further comprises:

setting the second picture level in-loop filter indicator for the second picture based on a coding structure associated with coding the second group of pictures, wherein the coding structure comprises a hierarchical B structure, the second picture is a non-reference B-picture, and setting the second picture level in-loop filter indicator for the second picture comprises setting the second picture level in-loop filter indicator to off responsive to the second picture being a non-reference B-picture.

15. The method of claim 13, wherein, responsive to the second picture level maximum coding bit limit comparing favorably to the first threshold or the second picture level quantization parameter comparing unfavorably to the second threshold, the method further comprises:

setting the second picture level in-loop filter indicator for the second picture based on a coding structure associated with coding the second group of pictures, wherein the coding structure comprises a low delay coding structure having a constant maximum coding bit limit for pictures other than a first temporal picture of the second group of pictures and setting the second picture level in-loop filter indicator for the second picture comprises setting in-loop filter indicators to off for the second group of pictures at a fixed picture interval.

16. The method of claim 13, wherein, responsive to the second picture level maximum coding bit limit comparing favorably to the first threshold or the second picture level quantization parameter comparing unfavorably to the second threshold, the method further comprises:

setting the second picture level in-loop filter indicator for the second picture based on a coding structure associated with coding the second group of pictures, wherein the coding structure comprises an adaptive quantization parameter low delay coding structure and setting the second picture level in-loop filter indicator for the second picture comprises setting the second picture level in-loop filter indicator to off when a high quantization parameter is associated with the second picture and setting the second picture level in-loop filter indicator to on when a low quantization parameter is associated with the second picture.

17. The method of claim 13, wherein, responsive to the second picture level in-loop filter indicator being set to on for the second picture, the method further comprises:

determining, for a coding unit of the second picture, at least one of a motion vector associated with the coding unit is a zero motion vector or a prediction residue associated with the coding compares favorably to a third threshold;

setting a coding unit level in-loop filter indicator for the coding unit to off responsive to the coding unit having a zero vector motion vector or a prediction residue that compares favorably to the third threshold; and skipping in-loop filtering for the coding unit responsive to the coding unit level in-loop filter indicator being off for the coding unit.

18. At least one non-transitory machine readable medium comprising a plurality of instructions that, in response to being executed on a computing device, cause the computing device to perform video coding by:

determining, for first and second pictures of first and second groups of pictures, respectively, first and second picture level maximum coding bit limits and picture level quantization parameters, respectively;

setting a first picture level in-loop filter indicator for the first picture to off, to indicate one of constrained directional enhancement filtering or loop restoration filtering is to be bypassed for the first picture, responsive to the first picture level maximum coding bit limit comparing unfavorably to a first threshold and the first picture level quantization parameter comparing favorably to a second threshold;

setting a second picture level in-loop filter indicator for the second picture based at least in part on a comparison of the second picture level maximum coding bit limit to the first threshold and the second picture level quantization parameter to the second threshold; and coding the first and second pictures based at least in part on the first and second picture level in-loop filter indicators to generate a bitstream.

19. The non-transitory machine readable medium of claim 18 further comprising instructions that, in response to being executed on the computing device, cause the computing device to perform video coding by:

setting, responsive to the second picture level maximum coding bit limit comparing favorably to the first threshold or the second picture level quantization parameter comparing unfavorably to the second threshold, the second picture level in-loop filter indicator for the second picture based on a coding structure associated with coding the second group of pictures, wherein the coding structure comprises a hierarchical B structure, the second picture is a non-reference B-picture, and setting the second picture level in-loop filter indicator for the second picture comprises setting the second picture level in-loop filter indicator to off responsive to the second picture being a non-reference B-picture.

20. The non-transitory machine readable medium of claim 18 further comprising instructions that, in response to being executed on the computing device, cause the computing device to perform video coding by:

setting, responsive to the second picture level maximum coding bit limit comparing favorably to the first threshold or the second picture level quantization parameter comparing unfavorably to the second threshold, the second picture level in-loop filter indicator for the second picture based on a coding structure associated with coding the second group of pictures, wherein the coding structure comprises a low delay coding structure having a constant maximum coding bit limit for pictures other than a first temporal picture of the group of pictures and setting the in-loop filter indicator for the second picture comprises setting in-loop filter indicators to off for the group of pictures at a fixed picture interval.

21. The non-transitory machine readable medium of claim 18 further comprising instructions that, in response to being executed on the computing device, cause the computing device to perform video coding by:

setting, responsive to the second picture level maximum coding bit limit comparing favorably to the first threshold or the second picture level quantization parameter comparing unfavorably to the second threshold, the second picture level in-loop filter indicator for the second picture based on a coding structure associated with coding the second group of pictures, wherein the coding structure comprises an adaptive quantization parameter low delay coding structure and setting the second picture level in-loop filter indicator for the second picture comprises setting the second picture level in-loop filter indicator to off when a high quantization parameter is associated with the second picture and setting the second picture level in-loop filter indicator to on when a low quantization parameter is associated with the second picture.

22. The non-transitory machine readable medium of claim 18 further comprising instructions that, in response to being executed on the computing device, cause the computing device to perform video coding by:

determining, responsive to the second in loop filter indicator being set to on and for a coding unit of the second picture, at least one of a motion vector associated with the coding unit is a zero motion vector or a prediction residue associated with the coding unit compares favorably to a third threshold;

setting a coding unit level in-loop filter indicator for the coding unit to off responsive to the coding unit having a zero vector motion vector or a prediction residue that compares unfavorably to the third threshold; and skipping in-loop filtering for the coding unit responsive to the coding unit level in-loop filter indicator being off for the coding unit.

* * * * *